United States Patent
Wu et al.

(10) Patent No.: US 11,392,596 B2
(45) Date of Patent: Jul. 19, 2022

(54) EFFICIENT INNER PRODUCT OPERATIONS

(71) Applicant: GOOGLE LLC, Mountain View, CA (US)

(72) Inventors: Xiang Wu, Piscataway, NJ (US); Dave Dopson, Jersey City, NJ (US); David Morris Simcha, Jersey City, NJ (US); Sanjiv Kumar, Jericho, NY (US); Ruiqi Guo, Elmhurst, NJ (US)

(73) Assignee: Google LLC, Mountain View, CA (US)

( * ) Notice: Subject to any disclaimer, the term of this patent is extended or adjusted under 35 U.S.C. 154(b) by 479 days.

(21) Appl. No.: 16/411,376

(22) Filed: May 14, 2019

(65) Prior Publication Data

US 2019/0347256 A1 Nov. 14, 2019

Related U.S. Application Data

(60) Provisional application No. 62/679,336, filed on Jun. 1, 2018, provisional application No. 62/671,409, filed on May 14, 2018.

(51) Int. Cl.
*G06F 16/2458* (2019.01)
*G06F 16/2453* (2019.01)
(Continued)

(52) U.S. Cl.
CPC ...... *G06F 16/2465* (2019.01); *G06F 16/2272* (2019.01); *G06F 16/2462* (2019.01); *G06F 16/24542* (2019.01); *G06F 16/252* (2019.01)

(58) Field of Classification Search
CPC ............ G06F 16/2465; G06F 16/2462; G06F 16/252; G06F 16/2272; G06F 16/24542
See application file for complete search history.

(56) References Cited

U.S. PATENT DOCUMENTS 2,632,058 A 3/1953 Frank
5,194,950 A 3/1993 Murakami et al.
(Continued)

OTHER PUBLICATIONS

Ganguly et al., Processing Data-Stream Join Aggregates Using Skimmed Sketches, Feb. 2004, pp. 569-586 in "Lecture Notes in Computer Science", vol. 2992/2004, Advances in Database Technology—EDBT 2004: 9th International Conference on Extending Database Technology, Heraklion, Crete, Greece (Year: 2004).*

(Continued)

*Primary Examiner* — Cheyne D Ly
(74) *Attorney, Agent, or Firm* — Brake Hughes Bellermann LLP

(57) ABSTRACT

A systems and method for providing various improvements in the computing time and accuracy for finding items using a hybrid vector space inner-product search are described. In one example implementation, a computer system comprising: at least one processor; and a data store of hybrid records, each hybrid record in the data store including a dense component and a sparse component memory storing instructions that, when executed by the at least one processor, cause the system to: receive a query request that includes a query vector; generate a dense query component and a sparse query component from the query vector; determine dense component similarity values between the dense query component and dense components of at least some of the hybrid records; determine sparse component similarity values using the sparse query component and sparse components of at least some of the hybrid records; select an initial set of hybrid records from the data store based on the dense component similarity values and the sparse component similarity values; and respond to the query request with at least some of the records from the initial set of hybrid records, is described.

22 Claims, 13 Drawing Sheets

(51) Int. Cl.
G06F 16/25 (2019.01)
G06F 16/22 (2019.01)

(56) References Cited

U.S. PATENT DOCUMENTS

| | | | |
|---|---|---|---|
| 5,677,986 | A | 10/1997 | Amada et al. |
| 6,081,274 | A | 6/2000 | Shiraishi |
| 6,404,925 | B1 | 6/2002 | Foote et al. |
| 7,007,019 | B2 | 2/2006 | Kanno et al. |
| 7,127,469 | B2* | 10/2006 | Lindblad ............. G06F 16/83 |
| 7,152,065 | B2 | 12/2006 | Behrens et al. |
| 8,077,994 | B2 | 12/2011 | Zhang et al. |
| 10,255,323 | B1 | 4/2019 | Guo et al. |
| 2002/0178158 | A1 | 11/2002 | Kanno |
| 2004/0220944 | A1 | 11/2004 | Behrens et al. |
| 2006/0143170 | A1* | 6/2006 | Ganguly ........ G06F 16/24568 707/999.005 |
| 2007/0263746 | A1 | 11/2007 | Son |
| 2009/0304296 | A1 | 12/2009 | Zhang et al. |
| 2011/0080965 | A1 | 4/2011 | Liu et al. |
| 2013/0121600 | A1* | 5/2013 | Lin ................. G06K 9/4676 382/224 |
| 2014/0016698 | A1 | 1/2014 | Joshi et al. |
| 2014/0059552 | A1* | 2/2014 | Cunningham ..... G06F 16/2471 718/102 |
| 2014/0258295 | A1 | 9/2014 | Wang et al. |
| 2016/0148120 | A1 | 5/2016 | Takahashi |
| 2016/0259816 | A1 | 9/2016 | Song |
| 2017/0026665 | A1 | 1/2017 | Duan et al. |
| 2018/0341805 | A1 | 11/2018 | Jain et al. |
| 2019/0073590 | A1* | 3/2019 | Wu ..................... G06N 3/063 |

OTHER PUBLICATIONS

Andoni, A., et al., "Near-Optimal Hashing Algorithms for Approximate Nearest Neighbor in High Dimensions", 47th Annual IEEE Symposium on Foundations of Computer Science,, 2006, pp. 459-468.

André, et al., "Accelerated Nearest Neighbor Search with Quick ADC", Proceedings of the 2017 ACM on International Conference on Multimedia Retrieval (ICMR '17), Jun. 6-9, 2017, pp. 159-166.

André, et al., "Cache locality is not enough: high-performance nearest neighbor search with product quantization fast scan", Proceedings of the VLDB Endowment 9, 4, 2015, pp. 288-299.

Auvolat, Alex, et al., "Clustering is Efficient for Approximate Maximum Inner Product Search", arXiv preprint arXiv:1507.05910, 2015, 10 pages.

Babenko, et al., "Efficient Indexing of Billion-Scale Datasets of Deep Descriptors", 2016 IEEE Conference on Computer Vision and Pattern Recognition (CVPR), pp. 2055-2063.

Bachrach, Y., et al., "Speeding Up the Xbox Recommender System using a Euclidean Transformation for Innerproduct Spaces", In Proceedings of the 8th ACM Conference on Recommender systems, 2014, pp. 257-264.

Bayardo, et al., "Scaling up all pairs similarity search", Proceedings of the 16th international conference on World Wide Web, May 2007, pp. 131-140.

Bennett, J., et al., "The Netflix Prize", In KDD Cup and Workshop in conjunction with KDD, 2007, 4 pages.

Billsus, et al., "Learning Collaborative Information Filters", Proceedings of the Fifteenth International Conference on Machine Learning (ICML '98), 1998, pp. 46-54.

Blalock, et al., "Bolt: Accelerated Data Mining with Fast Vector Compression", Proceedings of the 23rd ACM SIGKDD International Conference on Knowledge Discovery and Data Mining, 2017, pp. 727-735.

Bottou, L., et al., "Convergence Properties of the K-means Algorithms.", In Advances in Neural Information Processing Systems 7, 1994, pp. 585-592.

Cohen, E., et al., "Approximating Matrix Multiplication for Pattern Recognition Tasks", Journal of Algorithms, vol. 30, Issue 1999, pp. 211-252.

Cheng, et al., "Wide & Deep Learning for Recommender Systems", Proceedings of the 1st Workshop on Deep Learning for Recommender Systems (DLRS 2016), 2016, pp. 7-10.

Cremonesi, P., et al., "Performance of Recommender Algorithms on Top-N Recommendation Tasks", Proceedings of the fourth ACM conference on Recommender systems, 2010, pp. 39-46.

Cover, et al., "Elements of Information Theory", 2nd Edition, Wiley-Interscience, 2006, 563 pages.

Du, Chao, et al., "Inner product similarity search using compositional codes", CoRR,abs/1406.4966, 2014, 2014, pp. 1-20.

Davidson, J., et al., "The Youtube Video Recommendation System", Proceedings of the Fourth ACM Conference on Recommender Systems, 2010, pp. 293-296.

Dean, T., et al., "Fast, Accurate Detection of 100,000 Object Classes on a Single Machine", Proceedings of IEEE Conference on Computer Vision and Pattern Recognition,, 2013, 8 pages.

Elsayed, Tamer, et al., "Pairwise Document Similarity in Large Collections With Mapreduce", Proceedings of ACL-008: HLT, Short Papers (Companion Volume), Jun. 2008, pp. 265-268.

Fukunaga, Keinosuke, et al., "A branch and bound algorithm for computing k-nearest neighbors", Computers, IEEE Transactions on, 100(7), 1975, pp. 750-753.

Ge, et al., "Optimized Product Quantization", IEEE Transactions on Pattern Analysis and Machine Intelligence 36, 4, Apr. 2014, pp. 744-755.

Gong, Yunchao, et al., "Iterative quantization: A procrustean approach to learning binary Codes", Proceedings of the 2011 IEEE Conference on Computer Vision and Pattern Recognition (CVPR), 2011, pp. 817-824.

Gersho, et al., "Chapter 12—Constrained Vector Quantization", Vector Quantization and Signal Compression, The Springer International Series in Engineering and Computer Science (Communications and Information Theory), vol. 159, Springer, 1992, pp. 407-485.

Guo, Ruiqi, et al., "Quantization based fast inner product search", retrieved from https://ai2s2pdfs.s3.amazonaws.com/c0fe/5cacfcdde397d143bb3c6e6426aca1b500dd.pdf, Sep. 4, 2015, pp. 1-17.

Guo, et al., "Quantization based Fast Inner Product Search", Proceedings of the 19th International Conference on Artificial Intelligence and Statistics, AISTATS 2016, May 9-11, 2016, pp. 482-490.

Harper, et al., "The MovieLens Datasets: History and Context", ACM Trans. Interact. Intell. Syst. 5, 4, 2015, pp. 19:1-19:19.

Halton, John H., "A Combinatorial Proof of Cayley's Theorem on Pfaffians", Journal of Combinatorial Theory, vol. 1, 1966, pp. 224-232.

Jegou, H., et al., "Product Quantization for Nearest Neighbor Search", IEEE Transactions on Pattern Analysis and Machine Intelligence, vol. 33, Issue 1, Jan. 2011, pp. 117-128.

Koenigstein, N., et al., "Efficient Retrieval of Recommendations in a Matrix Factorization Framework", Proceedings of the 21st ACM International Conference on Information and Knowledge Management, 2012, pp. 535-544.

Kalantidis, Yannis, et al., "Locally Optimized Product Quantization for Approximate Nearest Neighbor Search", Computer Vision Foundation, Jun. 2014, 8 pages.

Kingma, et al., "Adam: A method for stochastic optimization", CoRR, abs/1412.6980, 2014, pp. 1-15.

Lynch, "Big Data: How do your data grow?", Nature, vol. 455, Sep. 2008, pp. 28-29.

Le, et al., "Distributed Representations of Sentences and Documents", Proceedings of the 31st International Conference on Machine Learning, vol. 32, 2014, pp. 1188-1196.

Ley, "The DBLP computer science bibliography: Evolution, research issues, perspectives", String Processing and Information Retrieval, 2002, pp. 1-10.

Moffat, et al., "Self-indexing inverted files for fast text retrieval", ACM Transactions on Information Systems (TOIS) 14, 4, 1996, pp. 349-379.

(56) References Cited

OTHER PUBLICATIONS

Martinez, et al., "Stacked Quantizers for Compositional Vector Compression", CoRR abs/1411.2173, Nov. 8, 2014, 8 pages.

Mikolov, Tomas, et al., "Distributed representations of words and phrases and their compositionality", Advances in neural information processing systems 26, 2013, pp. 3111-3119.

Norouzi, Mohammad, et al., "Cartesian k-means", Computer Vision and Pattern Recognition (CVPR), 2013 IEEE Conference on, 2013, pp. 3017-3024.

Neyshabur, Behnam, et al., "A simpler and better LSH for Maximum Inner Product Search (MIPS)", arXiv:1410.5518, Oct. 21, 2014, 9 pages.

Nister, David, et al., "Scalable recognition with a vocabulary tree", Conference on Computer vision and pattern recognition, IEEE computer society, Jun. 17, 2006, pp. 2161-2168.

Palangi, et al., "Deep Sentence Embedding Using Long Short-term Memory Networks: Analysis and Application to Information Retrieval", IEEE/ACM Trans Audio, Speech and Lang. Proc 24, 4, Jan. 16, 2016, pp. 694-707.

Ram, P., et al., "Maximum Inner-Product Search using Cone Trees", In SIGKDD International Conference on Knowledge Discovery and Data Mining, 2012, 9 pages.

Sabin, M. J., et al., "Product Code Vector Quantizers for Waveform and Voice Coding", IEEE Transactions on Acoustics, Speech, and Signal Processing, Jun. 1984, pp. 474-488.

Shan, et al., "Deep Crossing: Web-Scale Modeling Without Manually Crafted Combinatorial Features", Proceedings of the 22Nd ACM SIGKDD International Conference on Knowledge Discovery and Data Mining, Aug. 13-17, 2016, pp. 255-262.

Shen, Fumin, et al., "Learning binary codes for maximum inner product search", In ICCV, 2015, 2015, pp. 4148-4156.

Shrivastava, A., et al., "Asymmetric LSH (ALSH) for Sublinear Time Maximum Inner Product Search (MIPS)", In Advances in Neural Information Processing Systems, 2014, pp. 2321-2329.

Shrivastava, A., et al., "An Improved Scheme for Asymmetric LSH", arXiv:1410.5410, Nov. 13, 2014, 10 pages.

Shicong, Liu, et al., "Learning Better Encoding for Approximate Nearest Neighbor Search with Dictionary Annealing", retrieved from https://ai2-s2-pdfs.s3.amazonaws.com/9e8b/2623b432250733479265fdeaa819b7a55b35.pdf, 2015, 10 pages.

Spyromitros-Xioufis, Elcfthcrios, et al., "A Comprehensive Study Over VLAD and Product Quantization in Large-Scale Image Retrieval", IEEE Transactions on Multimedia, IEEE Service Center, vol. 16, No. 6, Oct. 6, 2014, pp. 1713-1728.

Szegedy, Christian, et al., "Going Deeper with Convolutions", arXiv:1409.4842, Sep. 2014, pp. 1-9.

Wang, et al., "Deep & Cross Network for Ad Click Predictions", CoRR abs/1708.05123, Aug. 17, 2017, 7 pages.

Wong, et al., "Implementations of partial document ranking using inverted files", Information Processing & Management, vol. 29, Issue 5, 1993, pp. 647-669.

Xiao, et al., "Attentional Factorization Machines: Learning the Weight of Feature Interactions via Attention Networks", Proceedings of the Twenty-Sixth International Joint Conference on Artificial Intelligence, IJCAI-17, Aug. 15, 2017, pp. 3119-3125.

Zobel, et al., "Inverted files for text search engines", ACM computing surveys (CSUR), vol. 38, No. 2, Article 6, Jul. 2006, 56 pages.

\* cited by examiner

700

```
CacheSort(X^S) begin
    input  : A sparse dataset X^S ∈ ℝ^{N×d^S}
    output : A permutation π : [N] ↦ [N]
    for j ← 1 to d^S do
      ⌊ nnz_j ← ∑_{i=1}^{N} 𝕀(X_j^{Si} ≠ 0)
    // Sort dimensions by number of nonzeros.
    η ← Argsort(nnz)
    // Initialize π to be identity.
    π ← 1, 2, ⋯ , N
    return PartitionByDim(X^S, 1, N, 1, π, η)

PartitionByDim(X^S, start, end, j, π, η) begin
    input  : Dataset X^S, index range to be sorted [start, end],
             Dimension to perform partition j,
             Sorted ordering of the dimensions η
    output : Permutation in range [start, end]
    if end - start ≤ 1 then
      ⌊ return [start ⋯ end]
    // Partition the range by η(j).
    for i ← start to end do
      ⌊ v_i ← 𝕀(X_{η(j)}^{Sπ(i)} ≠ 0)
    π', pivot ← Argpartition({v_i}_{i∈[start,⋯,end]})
    // Recursively partition the subpartitions
    // by the next most active dimension.
    π_1 ← PartitionByDim(X^S, start, pivot−1, j+1, π ∘ π', η)
    π_0 ← PartitionByDim(X^S, pivot, end, j+1, π ∘ π', η)
    return π' ∘ [π_1; π_0]
```

FIG. 7

EFFICIENT INNER PRODUCT OPERATIONS

CROSS-REFERENCE TO RELATED APPLICATIONS

This application is a Nonprovisional of, and claims priority to, U.S. Provisional Patent Application No. 62/671,409, filed on May 14, 2018, entitled "EFFICIENT INNER PRODUCT OPERATIONS" and U.S. Provisional Patent Application No. 62/679,336, filed on Jun. 1, 2018, entitled "EFFICIENT INNER PRODUCT OPERATIONS, the disclosures of which are incorporated by reference herein in their entirety.

FIELD

This application relates, generally, to data mining and/or machine learning operations on large data sets.

BACKGROUND

Many data mining and machine learning tasks involve computing the inner product of a query vector with a set of database vectors. Conventionally, a vector is an array of numbers where each position in the array represents a different datapoint. The number of array positions is referred to as the dimension of the vector. Some sources have sparse vectors, meaning that the very few positions in the vector have meaningful (non-zero) data. Some sources have dense vectors, which include meaningful data in most if not all vector positions. Some sources are heterogeneous, meaning the vectors have sparse components and dense components. Techniques for computing or approximating inner products have been developed for sparse vectors and other techniques have been developed for dense vectors, but techniques that perform well for sparse vectors have little overlap with techniques that work well for dense vectors. Specifically, current techniques for computing or approximating inner products of a dense data vector and a query vector perform poorly (e.g., are computationally inefficient or even infeasible and/or not accurate) when applied to sparse data vectors, which often have orders of magnitude more features. Similarly, current techniques for computing inner products of sparse data vectors and a query vector perform poorly when applied to dense data vectors.

SUMMARY

This disclosure describes systems and methods for providing various improvements in the computing time and accuracy for finding items using a hybrid vector space inner-product search. In one example implementation, a computer system comprising: at least one processor; and a data store of hybrid records, each hybrid record in the data store including a dense component and a sparse component memory storing instructions that, when executed by the at least one processor, cause the system to: receive a query request that includes a query vector; generate a dense query component and a sparse query component from the query vector; determine dense component similarity values between the dense query component and dense components of at least some of the hybrid records; determine sparse component similarity values using the sparse query component and sparse components of at least some of the hybrid records; select an initial set of hybrid records from the data store based on the dense component similarity values and the sparse component similarity values; and respond to the query request with at least some of the records from the initial set of hybrid records, is described.

In another example implementation, a non-transitory computer-readable storage medium having stored thereon computer executable program code which, when executed on a computer system, causes the computer system to perform a method, comprising: receiving a query request that includes a query vector; generating a dense query component and a sparse query component from the query vector; determining dense component similarity values between the dense query component and dense components of at least some hybrid records of a data store of hybrid records, each hybrid record in the data store including a dense component and a sparse component; determining sparse component similarity values using the sparse query component and sparse components of at least some of the hybrid records; selecting an initial set of hybrid records from the data store based on the dense component similarity values and the sparse component similarity values; and responding to the query request with at least some of the records from the initial set of hybrid records, is described.

In an additional example implementation, a method, comprising: receiving a query request that includes a query vector; generating a dense query component and a sparse query component from the query vector; determining dense component similarity values between the dense query component and dense components of at least some of the hybrid records of a data store of hybrid records, each hybrid record in the data store including a dense component and a sparse component; determining sparse component similarity values using the sparse query component and sparse components of at least some of the hybrid records; selecting an initial set of hybrid records from the data store based on the dense component similarity values and the sparse component similarity values; and responding to the query request with at least some of the records from the initial set of hybrid records, is described.

In one aspect, a method includes a computer-implemented method of progressive mesh compression. In one example implementation, the method may include determining priority values associated with collapse of each edge of a plurality of edges, a priority value of an edge determined based on an associated error metric value of the edge and selecting a first edge from the plurality of edges, the first edge selected from the plurality of edges based on the first.

BRIEF DESCRIPTION OF THE DRAWINGS

The details of one or more implementations are set forth in the accompanying drawings and the description below. Other features will be apparent from the description and drawings, and from the claims.

FIG. 7 illustrates example pseudo-code for generating a cache-sorted inverted index for efficient inner-product similarity in sparse vectors, in accordance with disclosed subject matter.

Like reference symbols in the various drawings indicate like elements.

DETAILED DESCRIPTION

Figure 1:
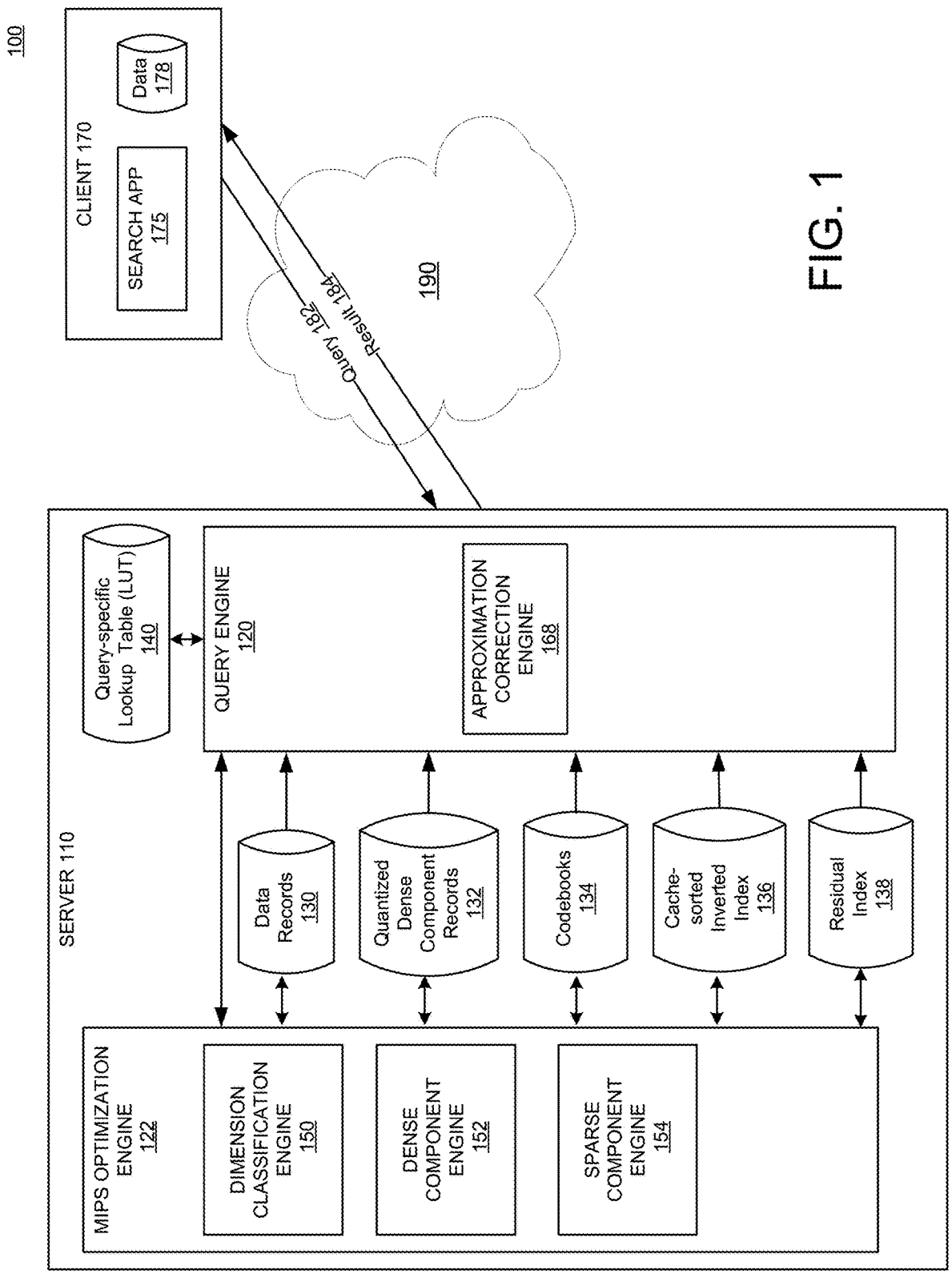
FIG. 1 illustrates an example system in accordance with the disclosed subject matter.

Reference will now be made in detail to non-limiting examples of this disclosure, examples of which are illustrated in the accompanying drawings. The examples are described below by referring to the drawings, wherein like reference numerals refer to like elements. When like reference numerals are shown, corresponding description(s) are not repeated and the interested reader is referred to the previously discussed figure(s) for a description of the like element(s).

FIG. 1 is a block diagram of a scalable maximum inner product search (MIPS) similarity system in accordance with an example implementation. The system 100 may be used to efficiently identify database items most similar to a query item based on an inner product calculation. The system 100 provides a more efficient operation on data items with sparse vectors, a more efficient operation on data items with dense vectors, and a more efficient way to determine similarity for hybrid vectors, e.g., having dense components and sparse components. The system may also improve accuracy of the results by employing residual reordering to identify the final set of database items similar to the query. The depiction of system 100 in FIG. 1 is described as a server-based search system. However, other configurations and applications may be used. For example, some operations may be performed on a client device. Furthermore, while the system 100 is described as a search system, the methods and techniques of disclosed implementations can be used in any task that uses a Maximum Inner Product Search, such as classifications performed in the last layer of neural networks with a large number (e.g., millions) of output nodes, for example. Thus, reference to search results is understood to include a set of items most similar to the query item regardless of whether the items are presented to a user. Put another way, implementations can be used to address any MIPS problem.

Figure 12:
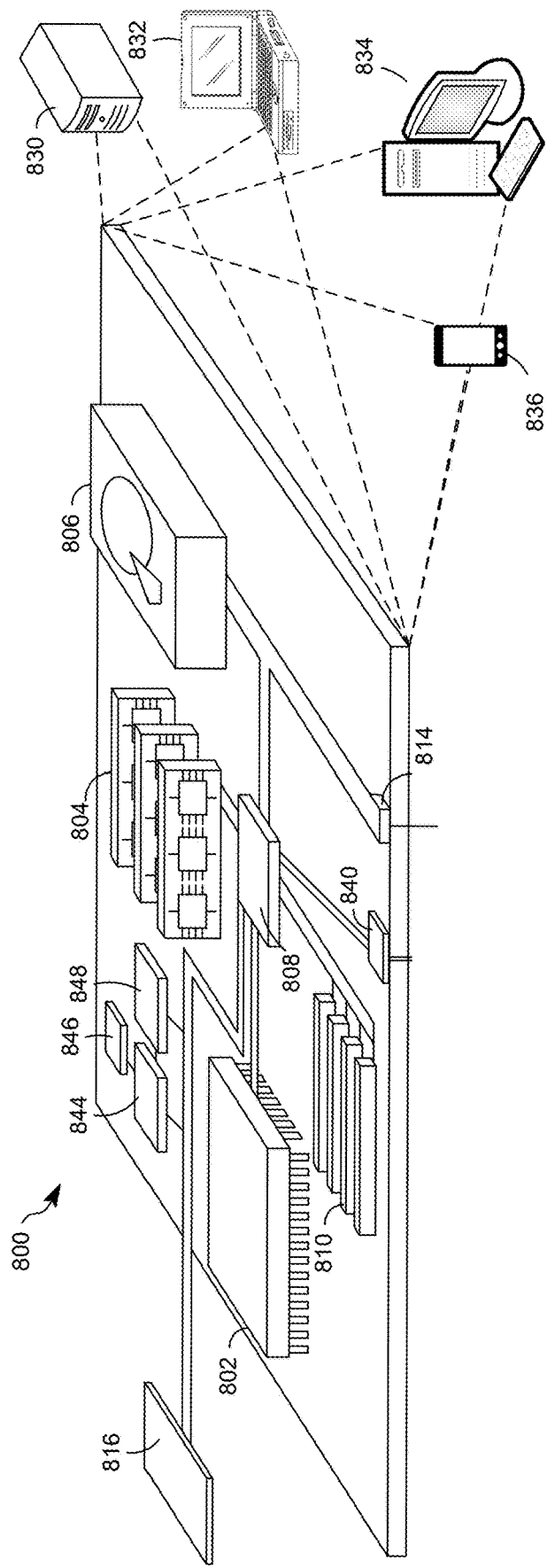
FIG. 12 shows an example of a computer device that can be used to implement the described techniques.
Figure 13:
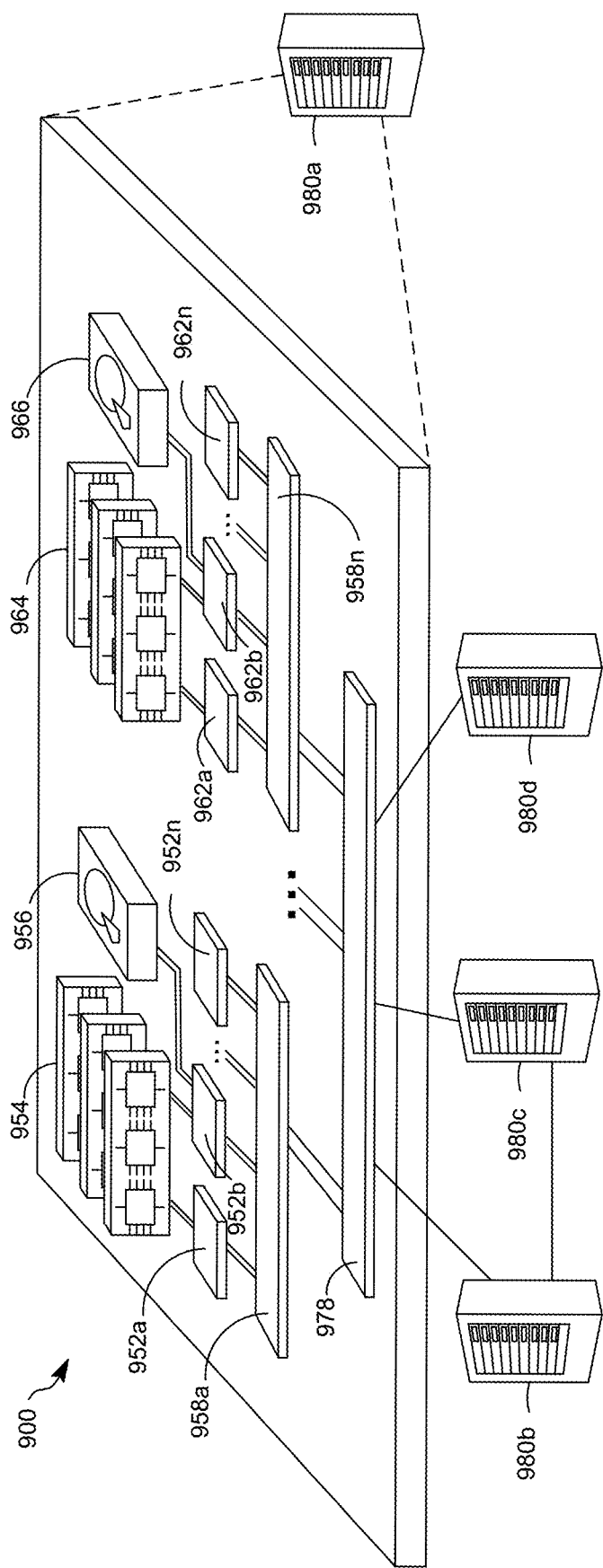
FIG. 13 shows an example of a distributed computer device that can be used to implement the described techniques.

The scalable MIPS system 100 may be a computing device or devices that take the form of a number of different devices, for example a standard server, a group of such servers, or a rack server system, such as server 110. In addition, system 100 may be implemented in a personal computer, for example a laptop computer. The server 110 may be an example of computer device 1200, as depicted in FIG. 12 or computer device 1300, as depicted in FIG. 13.

Although not shown in FIG. 1, the server 110 can include one or more processors formed in a substrate configured to execute one or more machine executable instructions or pieces of software, firmware, or a combination thereof. The processors can be semiconductor-based—that is, the processors can include semiconductor material that can perform digital logic. The processors may also include registers capable of performing data-level parallelism, e.g., single-instruction multiple-data (SIMD) processors using multiple registers. For example, a SIMD processor may use AVX2 registers, each of which has two 128-bit lanes. In some implementations, there may be sixteen AVX2 registers available for parallel processing in the SIMD processor. The server 110 can also include an operating system and one or more computer memories, for example a main memory, configured to store one or more pieces of data, either temporarily, permanently, semi-permanently, or a combination thereof. The memory may include any type of storage device that stores information in a format that can be read and/or executed by the one or more processors. The memory may include volatile memory, non-volatile memory, register memory, or a combination thereof, and store modules that, when executed by the one or more processors, perform certain operations. In some implementations, the modules may be stored in an external storage device and loaded into the memory of server 110.

The modules may include a maximum inner product search (MIPS) optimization engine 122 and a query engine 120. The MIPS optimization engine 122 may identify dense and sparse components of data records 130, e.g., using a dimension classification engine 150. In some implementations, the dimension classification engine 150 is configured to automatically identify dense components and sparse components. For example, the dimension classification engine 150 may use a machine-learned classifier to classify the dimensions. As another example, the dimension classification engine 150 may use a threshold to identify the components. For example, the dimension classification engine 150 may analyze a sample of or all values of a dimension and classify the dimension as sparse if the dimension fails to satisfy the threshold, e.g., classifying the dimension as sparse responsive to determining that 10% or fewer or 20% or fewer of the data records have a non-zero value for the dimension. In some implementations, the dimension classification engine 150 may classify the dimension as dense responsive to determining that a threshold is met, e.g., if over 70% or over 95% of the data records have non-zero values for the dimension. If the dimension is not classified as sparse, the dimension is dense. In some implementations, the dimension classification engine 150 may store or generate a classification table indicating which dimensions are dense and which are sparse. In some implementations, the mapping may be provided to the system, e.g., from manual identification. In some implementations, generation of the data vectors may place all dense dimensions at one end of the vector, so no classification is needed, and the dimension where the sparse dimensions begin is known. In some implementations, the data records 130 may be homogeneous, e.g., may all be considered sparse or may all be considered dense and dimension classification engine 150 is not used to classify the dimensions of the data records 130.

The data records 130 may be a data store of vectors. A vector may be thought of as an array of floating point numbers with a dimensionality of d, or in other words an array with d positions. A query, such as query 182, may also be expressed as a vector of dimension d. When d is large and the number of database entries is large (e.g., tens of thousands or even millions), computation of an inner product between a query vector and the database vectors is slow and computationally (processor) intensive. Techniques have been developed to speed up this computation, such as vector and product quantization and locally-sensitive hashing (LSH). But these techniques are not efficient for hybrid records, e.g., records with both dense and sparse components. For example, a hybrid record may have 200 dense dimensions where every or almost every data record has a non-zero value for each of the 200 dense dimensions, but also have 1 billion sparse dimensions, where each data record averages around 200 non-zero values per 1 billion dimensions. In a data store of millions or billions of data records, applying quantization is infeasible as the processing time is too long. Because of this, conventional systems apply a sparse technique to such datasets. Sparse techniques are feasible, but such techniques, such as LSH, provide an inaccurate result for dense components, leading to poor recall (i.e., the results are less accurate).

To provide high quality results while keeping processing time feasible, the system 100 identifies the dense component (s) and sparse component(s) in a hybrid dataset and applies a dense similarity technique to the dense components and a sparse similarity technique to the sparse components. Due to the decomposability of the inner product measure the system 100 can approximate the inner products separately and add the results together. In addition, because the inner products can be done separately, the system 100 can use the separate calculations and residual reordering to more efficiently arrive at a high-quality result.

The MIPS optimization engine 122 may also include a dense component engine 152. The dense component engine 152 may apply an inner product technique to the dense component(s) of the data records 130. In some implementations the entire data record may be considered the dense component and the dense component engine 152 applies the technique to the entire data record. In some implementations, the dense component engine 152 may use any technique of efficiently calculating the inner product of dense vectors, such as vector quantization, product quantization, hybrid quantization, scalar quantization, etc. In some implementations, the dense component engine 152 may apply product quantization to the data records 130. Product quantization partitions each of the data records 130 into one of K partitions (K>1) and generates a codebook for each partition, e.g., codebooks 134. As explained in more detail below with regard to FIG. 2, each codebook 134 includes multiple entries, each entry representing a cluster value. For ease of explanation, this cluster value may also be referred to as the cluster center, but it need not be an actual cluster center. The result of the product quantization is quantized dense component records 132. Each record in the quantized dense component records 132 is a series of K indices, one index for each codebook. The indices can be used to retrieve corresponding cluster values from the codebooks, which when combined (concatenated) represent the quantized vector. For ease of explanation, the quantized data record may be understood to represent the quantized vector itself. Thus, reference to a quantized data record when used in the context of a comparison, e.g., to a query vector or a data record, may be understood to refer to the quantized vector. The resulting quantized dense component records 132 and the codebooks, e.g., codebooks 134, have a smaller memory footprint than the database of data records 130 and can be used to more efficiently approximate an inner product operation with a query vector.

Quantization enables approximation of an inner product but introduces quantization error. The higher the error the less accurate the results, or in other words the results are of poorer quality. To reduce the error, in some implementations, the dense component engine 152 may also generate a residual index, e.g., in residual index 138, for the dense components. A residual vector represents the difference between the original data record and its corresponding quantized vector. In some implementations, the system 100 may generate the residual index for the dense portions by calculating the residuals for the dense portions of the data records 130, applying product quantization to the residuals to generate a second set of codebooks in codebooks 134, and storing the quantized residual record for each residual vector. As will be explained in more detail below, the residuals can be used to select a final search result from a superset of database items found similar to a query item.

Figure 2:
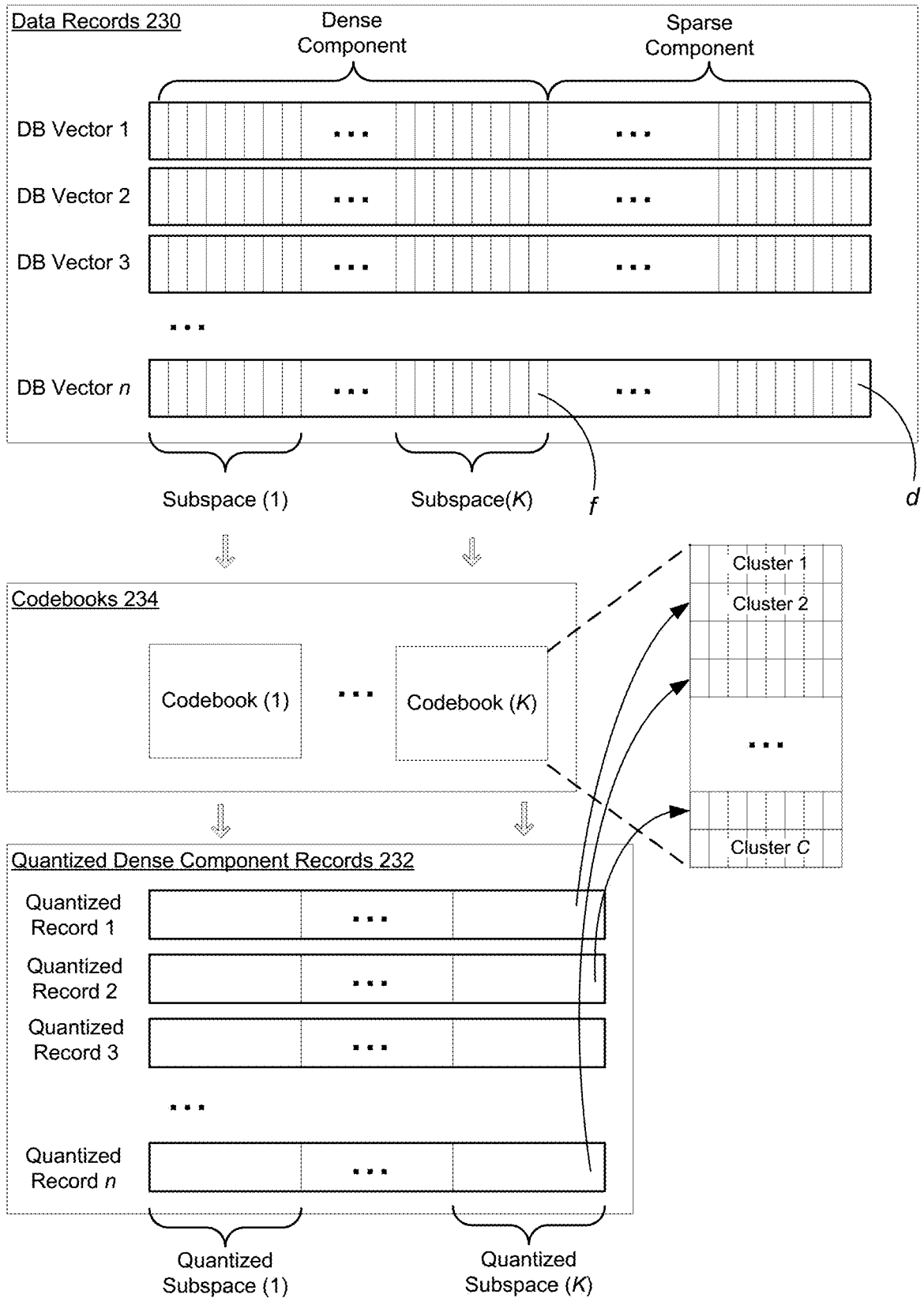
FIG. 2 illustrates a block diagram of product quantization of database vectors representing search items, in accordance with disclosed subject matter.

FIG. 2 illustrates example hybrid data records 230, codebooks 234, and quantized dense component records 232. Hybrid data records 230 may represent data records 130 of FIG. 1. Codebooks 234 may represent codebooks 134 of FIG. 1. Quantized dense component records 232 may represent quantized dense component records 132 of FIG. 1. In the example of FIG. 2, the hybrid data records 230 include n entries, or n distinct database items. Each item in data records 230 (e.g., (DB Vector 1, DB Vector 2, etc.) has d dimensions, or in other words d elements. In the example of FIG. 2, the first f dimensions are classified as dense. The remaining dimensions (f+1 to d) are classified as sparse. Of course where the entire data record is considered dense, f will equal d. The MIPS optimization engine 122 may quantize the data records 230 via product quantization using codebooks 234. In product quantization, the dense component engine 152 projects the data records 230 into K subspaces. A subspace is a block of elements from each data record occurring at the same dimension (i.e., same vector position). A subspace is also referred to as a sub-vector. In some implementations, f is divisible by K so that each block includes the same number of elements. Such an implementation is shown in FIG. 2, where each subspace is a block of eight dimensions or elements. In some implementations, even where f is divisible by K, direct division may result in subspaces where the number of elements in each subspace is not equal. In some implementations, division may be based on random or learned projection of the vectors. In some implementations, variably sized subspaces may be generated by assigning the first mod (f, K) subspaces an extra dimension each. In such implementations, the number of elements in each block may not be equal. In the example illustrated in FIG. 2, the projection or division results in K subspaces or sub-vectors, each subspace having n rows of eight elements.

Once the data records are projected into subspaces, the MIPS optimization engine 122 may perform vector quantization on each subspace separately, generating codebooks 234. The codebooks 234 include one codebook for each subspace. Thus, using the example of FIG. 2, the codebooks 234 include K codebooks. In some implementations, the codebooks for each subspace may be referred to collectively as a codebook for the data records 230. Each codebook may include an entry for each of C clusters. The quantity of clusters, C, may be determined as the codebooks 234 are generated or the quantity C may be passed in as a parameter to the dense component engine 152. For example, the parameter may indicate that the dense component engine 152 should generate 16 clusters for each codebook or 256 clusters for each codebook. In some implementations, the number of clusters (i.e., the value of C) may depend on the size of a register, e.g., a SIMD register. In other words, to improve computing time, the number of clusters may be limited to the number of parallel lookups a register in the system can perform. For example, C may be 16 so that a look up table, such as query-specific lookup table 140 can fit in-register and the system can use SIMD instructions for calculating the inner product. When clusters are generated, each cluster will have a cluster center. The cluster center is the entry for that cluster in the codebook. For example, in FIG. 2, subspace K (i.e., sub-vector (K)) has eight elements from each of n vectors (the data records). The dense component engine 152 may cluster the n vectors of eight elements each into one of K clusters. The cluster center may represent one of the database record's subspace. The cluster center may also represent eight elements that serve as the cluster center. For the ease of discussion, the codebook for the $k^{th}$ subspace may be represented by $S^{(k)}$. Because each codebook has C entries, the $c^{th}$ entry in the codebook may be represented by $S_c^{(k)}$.

The dense component engine 152 can use conventional clustering algorithms to generate the C clusters and determine the cluster centers. In some implementations, the system may learn the cluster centers, i.e., the codebook entries, for the codebooks. For example, the dense component engine 152 may use conventional clustering algorithms based on a Euclidean distance or k-means to learn the codebook for each subspace independently. In some implementations, the dense component engine 152 may initialize the codebooks 134 using random samples from the data records 130 prior to learning the cluster centers for each subspace.

In some implementations, the system may assign database vectors (data records 230) to an entry in the codebook via a C-dimensional one-hot assignment vector. A one-hot assignment vector for the vector x (e.g., $\alpha_x$) or for the $k^{th}$ subspace of vector x (e.g., $\alpha_x^{(k)}$) may be all zeros except for the position that represents the cluster assignment. In some implementations, the assignment vectors for x (e.g., $\alpha_x$) may be the quantized database item. In other words, in some implementations, the assignment vector may be the code word. A code word identifies the entry in the subspace codebook. The dot product of the assignment vector and the codebook thus provides the quantization vector for that subspace, or in other words the cluster center of the subspace. In some implementations, the code word may be a pointer to the codebook entry. For example, where C is 16, the code word may be a byte with a value of zero to 15, which identifies the entry in the codebook for the subspace. The dense component engine 152 may generate the quantized record by concatenating the code words from the different subspaces. In the example of FIG. 2, the code word from subspace (1) is first, followed by the code word for subspace (2) and ending with the code word for subspace (K). Of course other pointers or index identifiers may be used as a code word. The dense component engine 152 may store the quantized dense component records 232 and the codebooks 234 for use by the query engine 120.

Returning to FIG. 1, in some implementations, the MIPS optimization engine 122 may also include a sparse component engine 154. The sparse component engine 154 may apply an inner product technique to the sparse component(s) of the data records 130. In some implementations the entire data record, or in other words every dimension of data records 130, may be considered the sparse component and the sparse component engine 154 applies the technique to the entire data record. In some implementations, the sparse component engine 154 may use any technique of efficiently calculating the inner product or approximation of an inner product of sparse vectors, such as LSH, an inverted index, MinHash and other Hamming-based approaches, etc. In some implementations, the sparse component engine 154 may generate a cache-sorted inverted index to make the calculation of the inner product more efficient. Given a set of N sparse vectors, e.g., just the g sparse dimensions (where g is d minus f, f representing the dense dimensions of a hybrid data record and d representing all dimensions) of the n data records 130, the sparse component engine 154 constructs a set of inverted lists, each list corresponding to a different dimension of the g dimensions with at least one nonzero value. With such an index, the inner product of the sparse components of a query with a data record x is computed by summing over the nonzero dimensions of the query. In other words, for each nonzero dimension in the query, the inverted index list for that nonzero dimension is accessed at the $x^{th}$ position (e.g., the position for data record x). The $x^{th}$ position is also called a datapoint, and the $x^{th}$ position of every inverted index list represents the sparse component of a data record, e.g., the sparse components of a vector. If a dimension lacks a data record with a nonzero value it may be excluded from the inverted index. Thus, the inverted index is said to key the data records 130 by nonzero dimensions.

While the idea of an inverted index is simple, and used in some conventional systems, it is not a practically efficient solution. This is because modern x86 processors arrange memory into a sequence of 64-byte 'cache-lines'. When the system reads from a memory location that is not already cached, the CPU loads the 64-byte cache-line containing that address. The CPU never reads or writes fewer than 64 bytes at a time, even if the program only utilizes a small portion of that cache-line. Query performance for sparse inverted indices is significantly more constrained by the memory bandwidth required to access the accumulator than by the rate at which the CPU performs arithmetic operations. Thus, counting the expected number of cache-lines touched per query provides an accurate estimation of query time. Each accumulator cache-line can hold a fixed number of values B. For example, on x86 SIMD processors B is 16 for 32-bit accumulators and 32 for 16-but accumulators. Each aligned block of B consecutive datapoints shares an accumulator cache-line. For a particular dimension, if any of these B datapoints is nonzero, all queries active in that dimension will access the corresponding cache line. The cost of accessing another dimension within the same block of B datapoints is negligible compared with accessing a different cache-line. But in a sparse vector, the dimensions with nonzero values are frequently not located in the same block of B datapoints.

Figure 3:
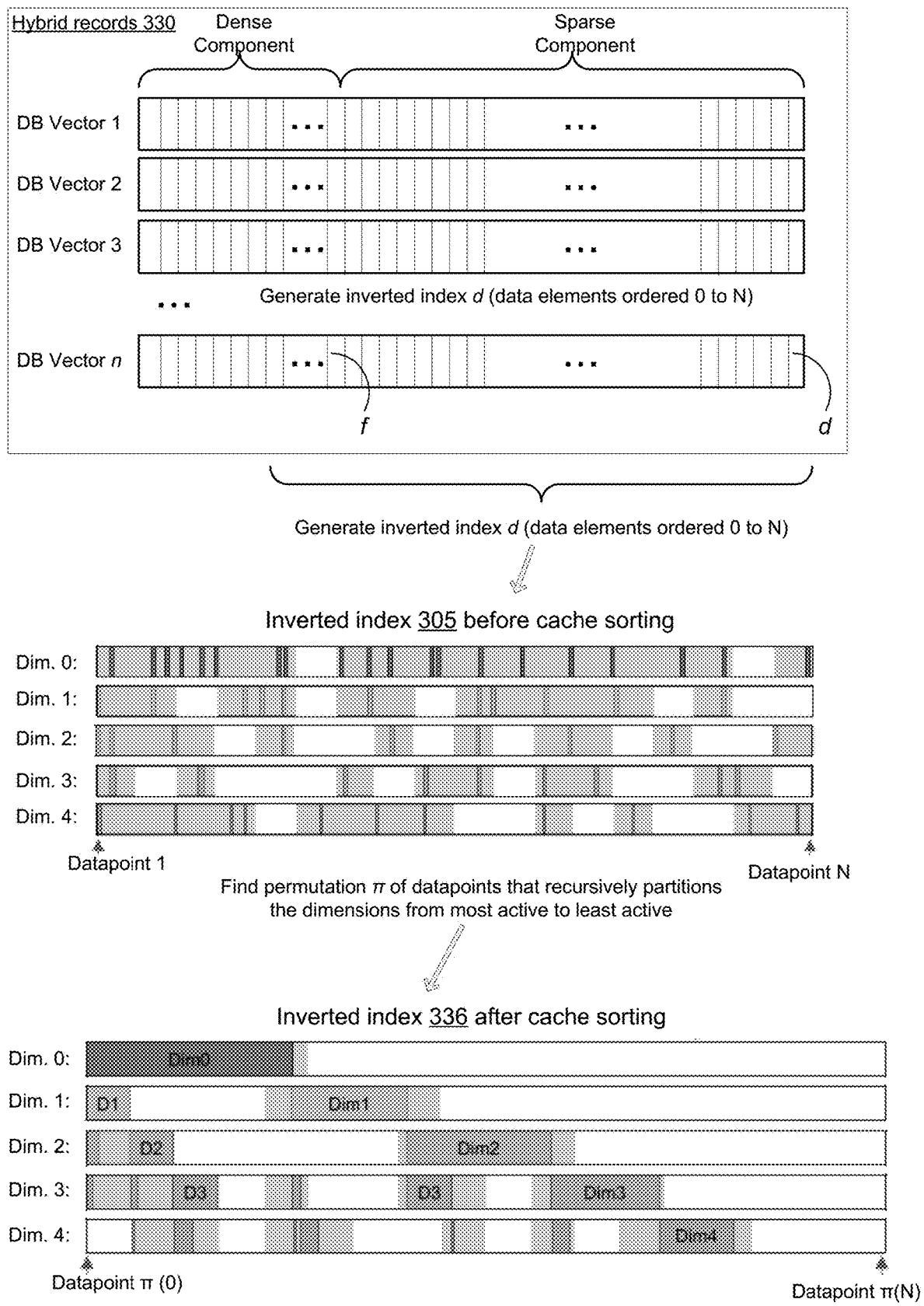
FIG. 3 illustrates a block diagram of a cache-sorted inverted index for sparse data vectors, in accordance with disclosed subject matter.

FIG. 3 illustrates an inverted index 305 generated from hybrid records 330. Hybrid records 330 are one example of data records 130 of FIG. 1. In the example of FIG. 3, the hybrid records 330 include f dense dimensions and d total dimensions, with the dense dimensions being contiguous. The inverted index 305 is not cache sorted. The colored small ties (e.g., red, yellow, etc.) indicate nonzero values. Gray areas represent memory addresses that are adjacent to the non-zero values. These values are included in the index because memory IO is always done in the unit of a cache line. So even if the system accesses a single number in the cache line, the system accesses the whole cache line. In visualization, that single value is colored either red or yellow and other values in the cache line that the system does not use are marked as gray. Datapoint 1 taken collectively across each dimension index list corresponds to DB Vector 1. Likewise, datapoint N taken collectively across each dimension index list correspond to DB Vector n. Inverted index 305 demonstrates that the non-zero datapoints are spread out and unlikely to be in the same block of B datapoints.

To make the inverted index more efficient, giving several-fold gains, in some implementations, the sparse component engine 154 may cache-sort the inverted index. A cache-sorted inverted index finds a permutation $\pi$ of datapoints that minimizes the cost of cache misses. The permutation $\pi$ is identified using a greedy algorithm that produces a highly efficient accumulator memory layout. The cache-sorted inverted index is more efficient than approximation using Linear Programming (LP) relaxation. LP relaxation is based on a simplified memory access model that is amenable to linear programming. In linear programming each cache line is associated with a binary variable, which is set to 1 if the cache line is accessed and 0 otherwise. Solving this binary optimization problem is NP-hard in general. LP relaxation is a common technique to relax these binary variables from {0, 1} to [0, 1], i.e., allowing them to take values anywhere between 0 and 1. A post-processing step converts these relaxed variables back into binary ones. The greedy approach used by some implementations takes only a few seconds even with millions of datapoints, while LP relaxation approaches are orders of magnitude more time consuming. The goal of cache sorting is to reorder the datapoint indices of shared active dimensions into long consecutive blocks as much as possible. Accordingly, the sparse component engine 154 may greedily select the most active dimension, i.e., the dimension that is nonzero in the most data records, and partition the dataset into two subsets, where the indices of the datapoints that have nonzero for that dimension are contiguous. The sparse component engine 154 may perform the partitioning recursively in the order of the dimensions (most active to least active).

Inverted index 336 illustrates index 305 after cache sorting. As illustrated in FIG. 3, dimension 0 was most active (most nonzero values) and the order of the datapoints has been changed so that all datapoints (all data records) with a nonzero value in dimension 0 appear first. Note that the datapoints of inverted index 336 are listed as $\pi(0)$ because this datapoint most likely no longer corresponds to database vector 1, but could be any of the N vectors. However, the datapoint $\pi(0)$, taken collectively across all dimension lists in the index, still correspond to a single database vector. Within the datapoints that have a nonzero value for dimension zero, the permutation orders the datapoints so that those with a nonzero value in the next most active dimension (Dim. 1 in FIG. 3) are contiguous. For datapoints with a zero in dimension 0, the permutation order makes datapoints with a nonzero value in dimension 1 contiguous. Because dimension 0 is most likely to have a value in common with the query (because it has more nonzero values that any other dimension), the permutation makes it possible to access the maximum number of datapoints in one cache-line. More details on how the permutation it is identified are provided with regard to FIGS. 6 and 7. The system may store the inverted index 336, e.g., as cache-sorted inverted index 136.

In some implementations, the sparse component engine 154 may generate an even sparser representation of the sparse component by pruning out small entries. Without pruning, the cache-sorted inverted index 136 provides an actual inner product, rather than an approximation. But pruning reduces the size of the index, e.g., cache-sorted inverted index 136, and the amount of arithmetic operations performed in a search. Pruning helps cache sorting generate even more continuous memory layout in the index. The system 100 may prune the sparse dimensions because only a small number of dimensions contribute nonzero products to the overall inner product between two sparse vectors. Also, in each dimension, the occurrence of large absolute values is rare. Thus, the contribution from small entries to the overall inner product pales in importance to the contribution from large entries. In some implementations, the sparse component engine 154 prunes datapoints that fail to meet a threshold for the dimension. This results in some nonzero dimensions for a database record being discarded, but improves the performance of the cache-sorted inverted index 136. Because of the loss of data, pruning results in an approximation of the inner product.

In some implementations, the MIPS optimization engine 122, may further improve the recall of the inner product operation through residual reordering. Inner product techniques described herein can be lossy approximations of a true inner product. For example, pruning makes the cache-sorted inverted index lossy, and quantization is lossy. These lossy approximations often trade processing speed for accuracy. The residual is the difference between the original component and its index approximation (e.g., represented by the cache-sorted inverted index 136 and/or codebooks 134 and quantized dense component records 132). Residual reordering uses the residuals, represented by a residual index 138, to quickly re-score a superset of candidate responsive data records. For example, if a search result, such as result 184, includes h data records, the system 100 may overfetch $\alpha$h candidate responsive records using the approximations (e.g., codebooks 134 and cache-sorted inverted index 136 that has been pruned) and use the residual index to select h records from the $\alpha$h candidate responsive records. Due to simple decomposition, the system can obtain the exact inner product by adding the inner product between the query and the residual to the approximate inner product (between the query and the data record representation, e.g., based on the quantized data item or the cache-sorted index). With the exact inner product, the system can select the h candidates having the maximum exact inner product while still taking advantage of efficiencies provided by the approximations. In other words, by using residual reordering the system reaps the benefit of fast approximations while maintaining high recall at small cost.

In some implementations, the residual may be calculated and stored in residual index 138. In such implementations, the system 100 calculates the inner product between the residuals in the index 138 and the query item and adds the result to the approximation for each respective candidate data record. This new value is used to reorder and filter the candidate data records. In some implementations the system 100 may build another index, for example quantizing the dense components of a residual vector and/or generating a cache-sorted index on the sparse components of the residual vector. In such implementations, the system may use the appropriate approximation techniques to determine the inner product between the residual vectors and the query vector. In this case the approximate inner product for the residual is added to the approximate inner product previously calculated for the data record during reordering.

For hybrid data records 130, where the inner product approximation of the dense component is added to the inner product approximation of the sparse component, the reordering may be accomplished in stages. For example, at a first stage the system 100 may identify αh candidate responsive records via the sum of the inner product approximations on dense components and sparse components, which can be any combination of approximations and are not limited to techniques discussed herein. α can be tuned to balance recall and search time. The system may reorder the superset of αh candidate responsive records using the dense residuals first to identify βh data records most similar to the query vector. The system may then use the sparse residuals to select the final h data records from the βh data records, returning the h data records as the result, e.g., result 184. The system 100 may perform variations of this, e.g., by only using dense residuals to select the h data records from the superset where the sparse component is not an approximation. Implementations also include other combinations, such as using sparse residuals first. Thus, the dense component engine 152 and/or the sparse component engine 154 may generate one or more residual indices 138, to be used at query time for residual reordering.

Once the MIPS optimization engine 122 has generated the codebooks, generated quantized vectors, e.g., quantized dense component records 132, generated the cache-sorted inverted index 136, and optionally generated residual index 138, the system 100 is ready to use the codebook 134, the cache-sorted inverted index 136, quantized dense component records 132, and residual index 138 to respond to queries. The modules may thus include query engine 120. The query engine 120 may be configured to use the codebooks 134, quantized dense component records 132, and cache-sorted inverted index 136 to identify data records 130 that are responsive to, i.e., most similar to, a query 182 and to provide a result 184 in response to the query 182. The query engine 120 may include modules or engines that create a query vector from the query 182 using conventional techniques. The query engine 120 may partition the query vector into dense components and sparse components, e.g., using dimension classification engine 150. In some implementations generation of the query vector may place all dense dimensions at one end of the vector, so no classification is needed. Instead, metadata may indicate where the sparse dimensions begin. For dense dimensions, the query engine 120 may project the dense components of the query vector into subspaces. The subspaces that the query vector is projected into match the subspaces that the data records 130 are projected into. Thus, the query vector may have K subspaces.

In some implementations, the query engine 120 may generate a query-specific lookup table (LUT) 140. Lookup table 140 may store the result of the inner product of each cluster center in each codebook 134 with the corresponding subspace of the query vector. Thus, the system may precompute the inner product between each cluster center in each codebook and the corresponding query vector subspace and store the inner product result in the lookup table 140. This may result in a table or database where the result of the inner product can be accessed by knowing the code word for any particular subspace (e.g., which cluster in which subspace). These code words make up the quantized dense component records 132. In some implementations, the lookup table 140 may be stored in-register, e.g., in SIMD registers. The query engine 120 may use the lookup tables 140 to substantially speed up the search, even over in-memory tables. However, use of in-register tables may mean that C is selected based on the capacity of the register, e.g., 16 or 32.

The query engine 120 may then determine the inner product of the dense components of the query vector with the dense components of the data records 130 (e.g., based on the quantized dense component records 132 or another dense vector technique) and, in parallel, determine the inner product of the sparse components of the query vector with the sparse components of the data records 130 (e.g., based on the cache-sorted inverted index 136 or another sparse inner product technique). The query engine 120 may add the inner product result of the dense component to its corresponding sparse component inner product result to generate the approximate inner product score for a data record with regard to the query vector. In some implementations, the query engine 120 may apply residual reordering, as described above, to filter the best data records from a superset of data records.

In some implementations, the query engine 120 may use a more efficient LUT (lookup table) process to determine the approximate inner product between the dense components of the query vector and each data record. In general, the efficient LUT process eliminates an instruction from a loop performed several times per data record, replacing it with an instructions performed once per data record. The elimination of the in-loop instruction yields a +50% improvement in throughput. The efficient LUT process is described in more detail below with regard to FIGS. 8, 9A, and 9B.

In some implementations, the query engine 120 may use a cache-sorted inverted index to determine the inner product between the sparse components of the query vector and each data record. To use the cache-sorted inverted index, the query engine 120 accumulates partial inner products between the non-zero dimensions in the sparse component of the query vector and the cache-sorted inverted index 136. In other words, for each nonzero dimension in sparse component of the query vector, the query engine 120 performs an inner product between the nonzero value and the inverted index list for the dimension. The results are added together, giving an inner product similarity score (e.g., the result) for each datapoint. The permutation is used to determine which database records correspond to the datapoints with the highest inner product result. Because the index is cache-sorted, as described herein, cache-line hits are minimized, which decreases processing time.

After separately determining inner product scores for the dense and sparse components of a data record, the query engine 120 adds those scores together to generate a similarity score with the query. In some implementations, the query engine 120 selects the search result using these scores, e.g., selecting h data records with highest similarity. In some implementations, the query engine 120 uses residual reordering to increase recall, e.g., improve the quality of the search results. For example, the query engine 120 may include an approximation correction engine 168 to apply residual reordering to the initially generated similarity scores. In such implementations, the approximation correction engine 168 selects αh candidate data records using the similarity scores, where α>1. Of the candidate data records, the approximation correction engine 168 may adjust the similarity score using the residual index 138. The residual index 138 represents the difference between the original data record and its approximation, if any. The approximation correction engine 168 may calculate an inner product between the residuals of the candidate data records and the query, adding the result to the similarity scores. These updated similarity scores may be used to select the final h data records to return as the search result. In some implementations, the residuals of the dense components may be used to pare down the candidate data records from αh candidate data records to βh candidate data records, where 1<β<α. Of the βh candidate data records, the approximation correction engine 168 may use the residual of the sparse components to select the final h data records, if needed (e.g., if the sparse inner product is an approximation rather than an actual inner product). In some implementations, the residuals of the sparse and the dense components may be used in parallel to select the final h data records. For example, the approximation correction engine 168 may calculate an inner product between the dense residuals for the candidate records and the dense component of the query at the same time as calculating the inner product between the sparse residuals for the candidate records and the sparse component of the query, which may both be respectively be added to the previously calculated similarity scores, and the approximation correction engine 168 may use the updated similarity scores to select the final h records.

In some implementations, the residual may be calculated and stored in residual index 138. In such implementations, the approximation correction engine 168 calculates the inner product between the residuals in the index 138 and the query item and adds the result to the approximation for each respective candidate data record. This new value is used to reorder and filter the candidate data records. In some implementations the approximation correction engine 168 may build another index, for example quantizing the dense components of a residual vector and/or generating a cache-sorted index on the sparse components of the residual vector. In such implementations, the system may use the appropriate approximation techniques to determine the inner product between the residual vectors and the query vector. In this case the approximate inner product for the residual is added to the approximate inner product previously calculated for the data record during reordering.

In some implementations, the query engine 120 may provide the results 184 for display at a client device, such as client 170. In some implementations, the query engine 120 may provide the results 184 to the requesting process for further processing, e.g., such as for classification.

Scalable MIPS system 100 may be in communication with client(s) 170 over network 160. Clients 170 may allow a user to provide query 182 to the query engine 120 and to receive result 184, which includes database items found responsive to the query based on the approximate inner product with the search query using the quantized database items. Network 160 may be for example, the Internet or the network 160 can be a wired or wireless local area network (LAN), wide area network (WAN), etc., implemented using, for example, gateway devices, bridges, switches, and/or so forth. Via the network 160, the scalable MIPS system 100 may communicate with and transmit data to/from clients 170. In some implementations, the client 170 may include applications, such as search app 175 that performs some or all of the functions of the query engine 120. For example, the quantized dense component records 132 and cache-sorted inverted index 136 do not take up much memory compared to data records 130 and may be of a size suitable for storage on the client 170, such as in data store 178. Data store 178 may include any type of non-volatile memory, such as flash, SD, RAM, disk, etc. The server 110 may transmit the quantized dense component records 132, codebooks 134, and cache-sorted inverted index 136 to the client 170 and the search application 175 may perform the actions described above with regard to query engine 120. In some implementations, the client 170 may be another server or distributed computing system. Client 170 may be another example of computing device 1200 or computing device 1300.

In some implementations, scalable MIPS system 100 may be in communication with or include other computing devices that provide updates to the data records 130. Scalable MIPS system 100 represents one example configuration and other configurations are possible. In addition, components of system 100 may be combined or distributed in a manner differently than illustrated. For example, in some implementations one or more of the query engine 120 and the MIPS optimization engine 122 may be combined into a single module or engine. In addition, components or features of the query engine 120 or the MIPS optimization engine 122 may be distributed between two or more modules or engines, or even distributed across multiple computing devices. For example, data records 130 and/or quantized dense component records 132 and/or cache-sorted inverted index 136 may be distributed across multiple computing devices.

Figure 4:
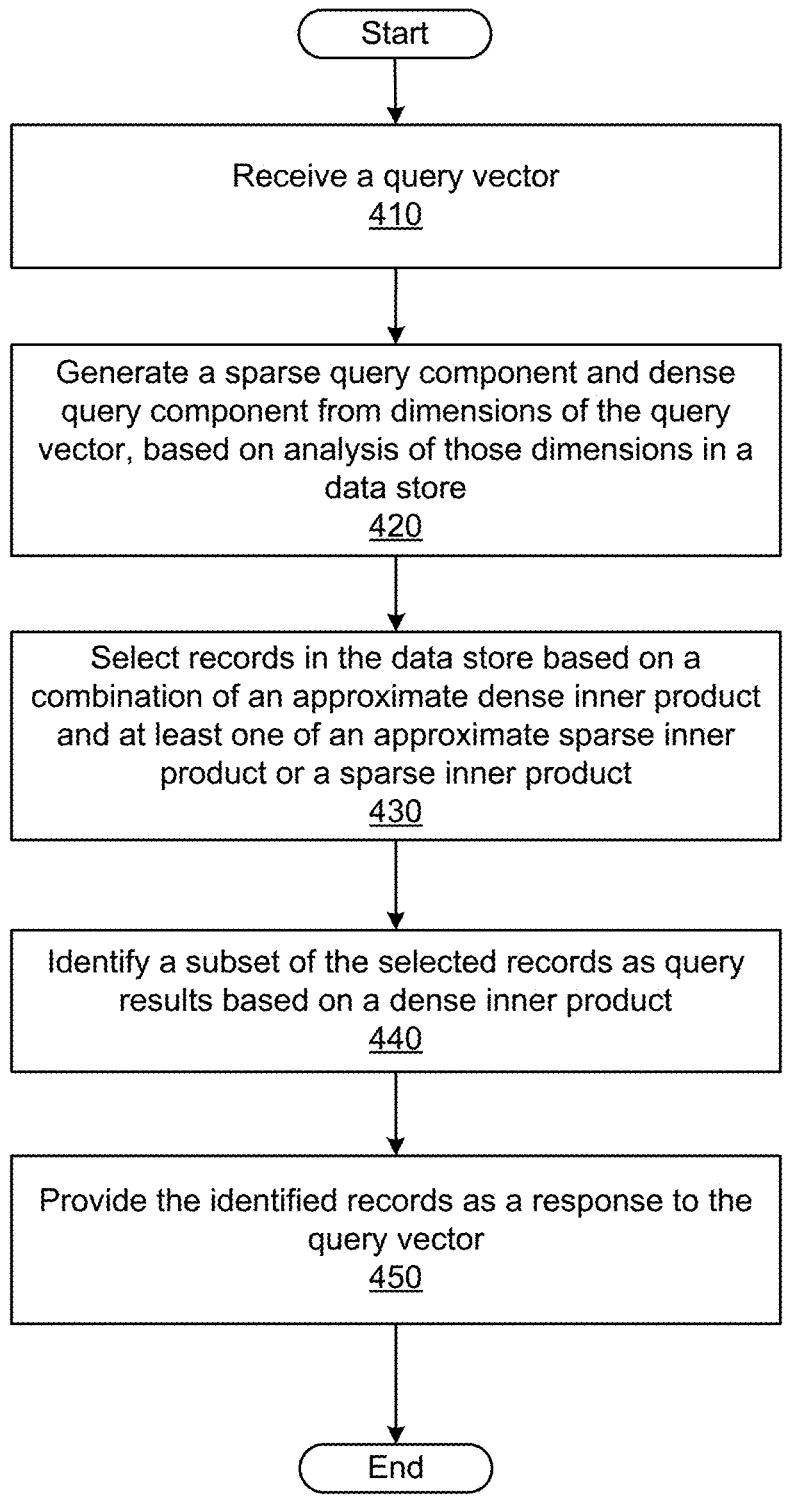
FIG. 4 illustrates a flow diagram of an example query process using a hybrid vector space inner-product search, according to an implementation.

FIG. 4 illustrates a flow diagram of an example query process using a hybrid vector space inner-product search, according to an implementation. Process 400 may be performed by a scalable MIPS system, such as system 100 of FIG. 1. Process 400 is an example of improving the efficiency of an inner product calculation on a hybrid data set (e.g., a data set with at least one dense component and at least one sparse component). Process 400 may be performed in response to receiving a query from a requesting process, e.g., to perform a movie, product, song, book, etc., recommendation, finding similar items in a massive database, extreme classification where the label set is in the order of millions or even billions.

Process 400 may begin with the scalable MIPS system receiving a query vector from a requesting process (410). The requesting process can be any process, including an online, batch, or browser process. The system identifies at least one sparse component and one dense component of the query vector (420). In some implementations, the dense component may be the first f dimensions and the sparse component may be the remaining dimensions. In some implementations, the system may use a mapping that indicates which dimensions are considered dense and which are sparse. The dense and sparse components in the query vector are identified using the same criteria used to classify the data records.

The system may select records in a data store as responsive to the query vector based on a combination of an approximate dense inner product and at least one of an exact sparse inner product or an approximate sparse inner product (430). In other words, the system generates a dense inner product score between the dense component of the query vector and each of the dense components of the records in the data store. The system uses an inner product approximation method optimized for dense vectors to calculate the dense inner product scores. The approximation used by the system can be any technique optimized for dense vectors, including but not limited to the efficient LUT16 technique described herein. The system also generates a sparse inner product score between the sparse component of the query vector and each of the sparse components of the records in the data store. The system uses an inner product technique optimized for sparse vectors to determine the sparse inner product scores. The inner product technique used by the system can be any technique optimized for sparse vectors, including but not limited to the cache-sorted inverted index technique described herein. For each record in the data store, the system adds the dense inner product score to the sparse inner product score to generate an inner product score for the data record. In some implementations, the system may select h records from the data store based on the inner product score, where h>0. These h records may be provided as a response to the query vector (450).

In some implementations, the system may select a superset of α·h records based on the inner product score and identify a subset of h of these records as the query results (440). The subset of h records may be identified using residual reordering for the dense component. In residual reordering, the system uses the inner product between a residual for the record and the query vector to correct for approximation error. The system performs the residual reordering only on the superset of records, which enables the system to take advantage of the benefits of approximation. In some implementations, the actual residual of the dense component is stored and used to calculate the exact inner product with the dense component of the query vector. This inner product score is added to the previously calculated inner product score and the system selects highest-scoring records based on the combined scores. However, calculating the dense inner product even for the superset of records may be too time consuming and the system may use the same approximation technique to determine the residual inner product score. For example, the system may have generated a codebook for the residuals, and generated quantized residual records, so that the inner product uses vector quantization, product quantization or hybrid quantization to generate the approximate residual inner product. This requires a bit more overhead to generate the additional code books and quantized vectors, but improves query speed dramatically.

Once the residual inner product scores are added to the inner product scores, the system can identify the final subset of records and provide them as a response to the query vector (450). Process 400 then ends for this query. It is understood that process 400 may be performed concurrently for different query vectors from the same or different requesting processes. It is also understood that in some implementations, where the sparse inner product is also an approximation, the system may perform step 440 again, using the sparse residuals, before identifying the subset of records to provide as a response to the query. In other words, the system may first pare the superset of selected records using residual reordering on the dense component, and then further pare the superset of selected records using residual reordering on the sparse component. In some implementations, the residual reordering may be done in parallel, e.g., the sparse residual inner product and the dense residual inner product determined in parallel and both added to the inner product of the respective records in order to identify the records provided in response to the query.

Figure 5:
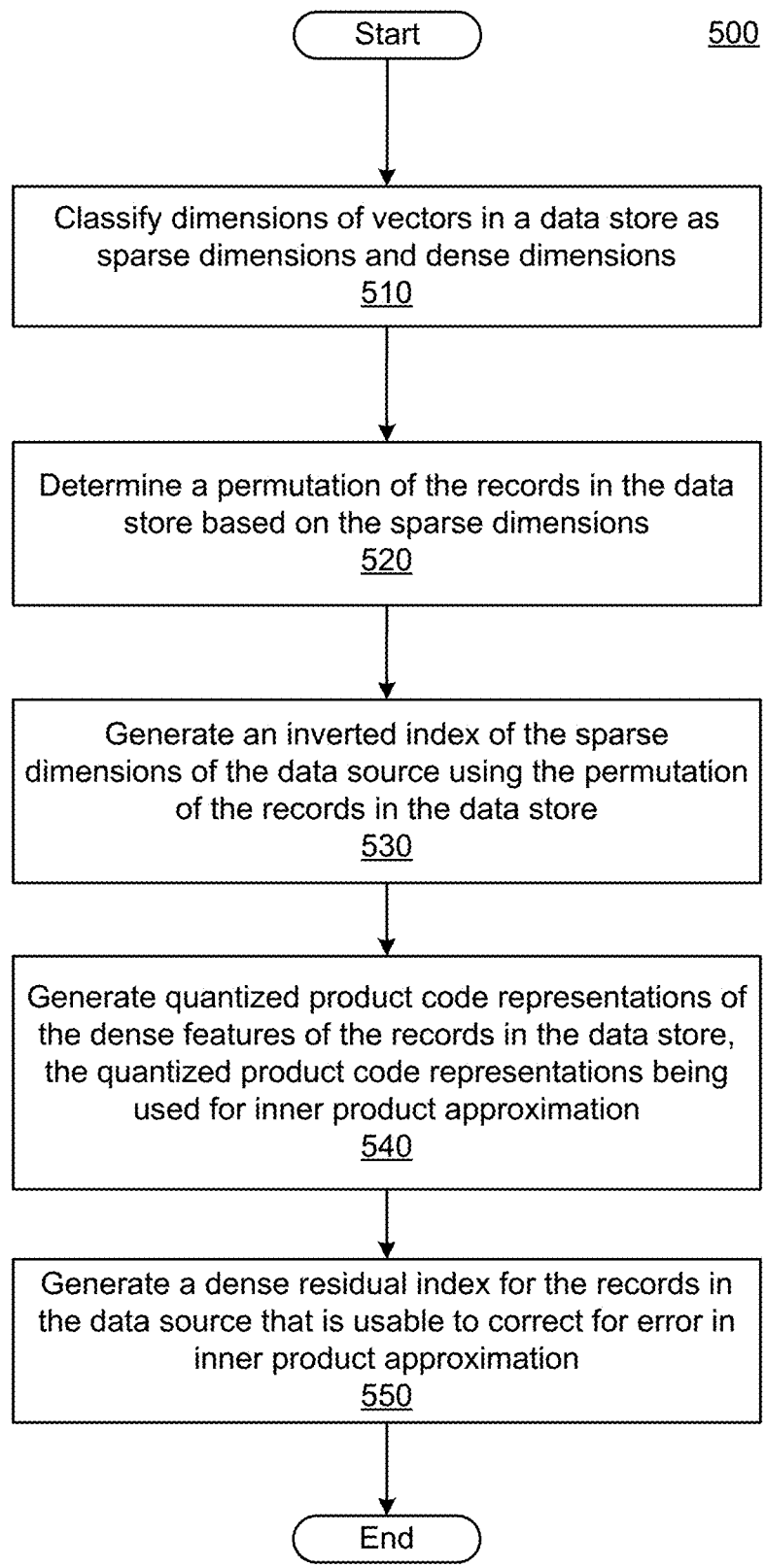
FIG. 5 illustrates a flow diagram of an example process for generating data structures used in an efficient vector space inner-product search, in accordance with disclosed subject matter.

FIG. 5 illustrates a flow diagram of an example process 500 for generating data structures used in an efficient vector space inner-product search, in accordance with disclosed subject matter. Process 500 may be performed by a scalable MIPS system, such as system 100 of FIG. 1. Process 500 is an example of improving the efficiency of an inner product calculation on a hybrid data set (e.g., a data set with at least one dense component and at least one sparse component). However, portions of process 500 may be performed by a system for using maximum inner product to determine similarity of dense vectors only, and/or portions of process 500 may be performed by a system for using maximum inner product to determine similarity of sparse vectors only. In other words, some implementations may use fewer that the steps presented. Some implementations may substitute similar steps for those presented (as one non-limiting example, LSH or an unsorted inverted index may be used in place of the cache-sorted index). The system may perform process 500 on all database vectors or on a single database vector, and may be performed periodically by the system so that the generated quantized database items, codebooks, and inverted index stays current. For example, the system may perform process 500 once a day, once a week, once an hour, etc. depending on how often the data store of records is updated with new items.

Process 500 may begin with the scalable MIPS system classifying dimensions of the vectors (i.e., records) in the data store as sparse or dense (510). This classification can be done via a machine-learned classifier. The system may generate a mapping of dimensions to either a sparse component or a dense component using the classifier. In some implementations, the system may use a threshold to classify the dimensions. For example, the system may analyze a sample of or all values of a dimension and classify the dimension as sparse if the dimension fails to satisfy the threshold, e.g., classifying the dimension as sparse responsive to determining, e.g., that 10% or fewer or 20% or fewer of the data records have a non-zero value for the dimension. In some implementations, the system may classify the dimension as dense responsive to determining that a threshold is met, e.g., if over 70% or over 95% of the data records have non-zero values for the dimension. If the dimension is not classified as sparse, the dimension is dense. In some implementations, the system may generate a mapping of dimensions to either a sparse component or a dense component based on the threshold determination. In some implementations, the system may receive a mapping that identifies dimensions as either sparse or dense. In some implementations, the system may reorder the dimensions according to their classification, so that dense dimensions appear at one end and sparse dimension appear at the other end of the vector. In some implementations, the system may receive a value indicating the boundary between the dense dimensions and the sparse dimensions, e.g., when the records in the data store have already been arranged by dense and sparse dimensions. In some implementations, the dense component is not contiguous, e.g., there may be several dense components identified in a record; however reference to "the dense component" includes all dense dimensions, whether contiguously stored or not. Similarly, "the sparse component" includes all sparse dimensions, whether contiguously stored or not.

The system may determine a permutation of the records in the data store based on the sparse dimensions (520). The permutation is an ordering of the data records that minimizes the cost of a query by minimizing cache-line accesses. The permutation is unique to each data store. The permutation ordering maximizes the probability that a dimension included in a query vector will be stored contiguously in a cache-line. FIG. 7 illustrates pseudo-code for determining the permutation. The system then generates a cache-sorted inverted index of the sparse dimensions, i.e., the sparse component, of the records in the data store using the permutation (530). This process is described in more detail below with regard to FIG. 6. In some implementations, steps 520 and 530 are optional (e.g., the entire record is considered dense) or may be replaced by a different technique for determining a maximum inner product in sparse datasets. In some implementations, the system may prune out small entries from the inverted index. This decreases the number of active dimensions, which reduces the size of the index and the number of arithmetic operations performed during a search, which lowers query response time. But pruning makes the use of the inverted index lossy, or in other words the inner product becomes an approximation instead of actual, so pruning is a tradeoff between speed and accuracy. To prune the index the system may, when determining whether a dimension has a nonzero value or not, consider values (the absolute value of a dimension) below a threshold to be zero. Each dimension may have a different threshold or they may share a threshold. Thresholds may be determined based on benchmarking. For example, implementations may benchmark the performance and accuracy on an array of thresholds and pick the one that gives the best tradeoff between performance and accuracy.

The system may generate quantized product code representations of the dense features of the records in the data store (540). The quantized product code representations are used to more efficiently approximate the maximum inner product between the records in the data store and a query vector. In product quantization, the system may project the dense component of each record into subspaces. In some implementations, each subspace may have an equal number of elements from the vector. In some implementations, the subspaces may not have equal numbers of elements. The system may assign each subspace an entry in a quantization codebook for the subspace. In some implementations, the assignment may occur as part of the generation of the codebooks through a clustering process. A codebook for a particular subspace thus includes an entry for each cluster, with the cluster center as the entry. The cluster center has the same number of elements (dimensions) as the corresponding portion of the dense component of the records in the subspace.

In other words, each subspace has a corresponding codebook, and each codebook has C entries. The value of C may depend on parameters provided to the procedure that generates the codebooks or the procedure may determine the value based on the data. In some implementations, the value of C may depend on the capacity of a register, e.g., a SIMD register or other register. For example, the value of C may be 16 so that a single register can hold the entire codebook for the subspace k of K. Each database vector (each record) subspace may be mapped or assigned to one of the C entries in the codebook for the subspace. In some implementations, the assignment may occur as part of generating the codebook. For example, when clustering is used, each vector subspace may be assigned to one of the clusters, as the clusters are generated from the vectors for a subspace. The system may generate a quantized vector for each record in the data store by concatenating each code word for each subspace. In some implementations, e.g., where C=16, the code word may be two bits, representing the numbers zero to 15, which represent index positions into the codebook for the subspace. The system may store each quantized record, along with the codebooks, in a data store, database, or other memory. In some implementations, step 540 is optional (e.g., the entire record is considered sparse) or may be replaced by a different technique for determining a maximum inner product in sparse datasets, e.g., vector quantization, LSTM hidden states, etc.

In some implementations, the system may generate a dense residual index for the records in the data source (550). The dense residual index is usable to correct the approximation error introduced by the inner product approximation, such as quantization. The residual index can be generated regardless of the method used to approximate the inner product of the dense component of the records. A residual is the difference between the approximated data record and the actual data record. Thus, for example, the system may find the residual of a data record by using the quantized data record to identify a cluster center for each of the K codebooks, concatenating the cluster centers together the generated the approximated data record. The difference between this record and the actual record in the data store is the residual. The system may calculate the residual for the dense components of each record after step 540. In some implementations, the residual is stored in the index. In some implementations, the system may quantize the residual vector, e.g., generating K residual codebooks (each with C entries) and storing a quantized residual vector (e.g., a series of code words into the residual codebooks, one code word per codebook). In this manner the system can calculate the inner product between a query vector and a residual in the same manner as the inner product is calculated between the query vector and the data records. In some implementations, the system may also generate a sparse residual index for the sparse component of the records in the data source. This may be used to correct approximation error for the sparse component, if there is one. As with the dense component, the residual index for the sparse component may be the actual residual or may be in the same form as the sparse component of the records (e.g., a cache-sorted inverted index).

Figure 6:
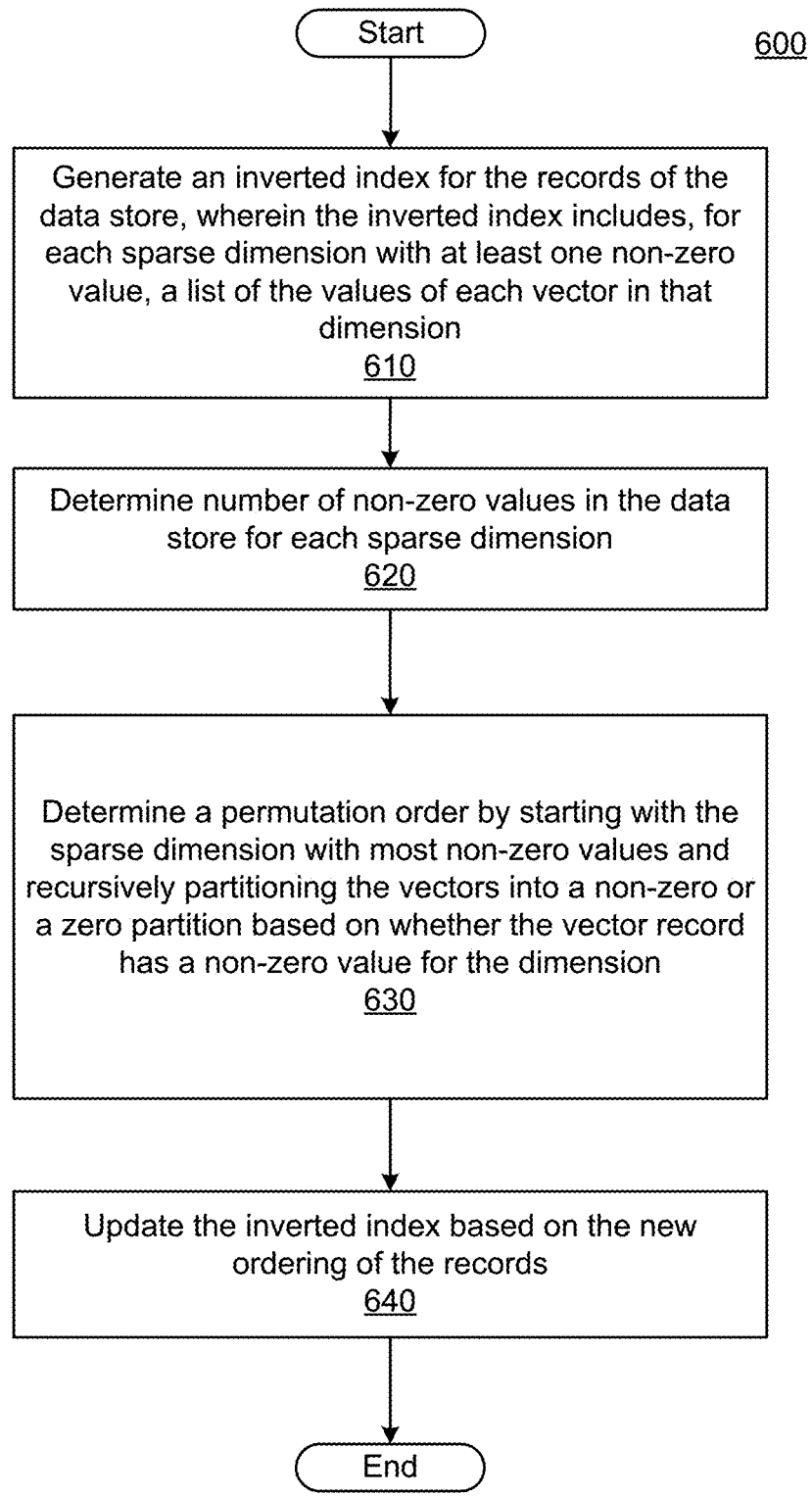
FIG. 6 illustrates a flow diagram of an example process for generating a cache-sorted inverted index for efficient inner-product similarity in sparse vectors, in accordance with disclosed subject matter.

FIG. 6 illustrates a flow diagram of an example process 600 for generating a cache-sorted inverted index for efficient inner-product similarity in sparse vectors, in accordance with disclosed subject matter. Process 600 may be performed by a scalable MIPS system, such as system 100 of FIG. 1. Process 600 is an example of steps 520 and 530 of FIG. 5, and significantly improves the throughput when calculating the inner product between a query vector and the data store records.

Process 600 may begin with the scalable MIPS system generating an inverted index for the records of the data store (610). The inverted index keys the data store by nonzero dimensions. In other words, for each sparse dimension, the inverted index a list of the records with at least one non-zero value in the sparse dimension. In implementations where the system prunes small entries, e.g., to decrease the size of the index, the system may prune such entries prior to building the index or the pruning may take place in a combined loop over all the datapoints. The system may determine the number of non-zero values in each dimension in the sparse component (620). This enables the system to determine the most active dimensions and order the dimensions from most active to least active. A dimension is active if there is a record in the data store that has a non-zero value for the dimension. The more records that have a non-zero value in the dimension, the more active the dimension. The system may determine a permutation order for the records by, starting with the most active sparse dimension, recursively partitioning the vectors (records in the data store) into a non-zero or zero partition based on whether the record has a nonzero value for the dimension or not (630). An example of this recursive process of partitioning the vectors is illustrated in the pseudo-code 700 of FIG. 7.

In the pseudo-code 700 of FIG. 7 Argsort performs an indirect sort and return the indices that index the data in a sorted order. Argpartition performs an indirect partitioning and returns the indices and pivot. Other examples may perform the sorting of dimensions using gray-code sorting order, by arranging the permuted indices of datapoints with $\mathbb{I}(x)_1=0$ AND $\mathbb{I}(x)_2=1$ and $\mathbb{I}(x)_1=1$ AND $\mathbb{I}(x)_2=0$ to be consecutive, where $\mathbb{I}(x) \in \{0,1\}^{\mathcal{A}}$ is the set of indicator variables for a datapoint $x^S$ where S is the set of sparse dimensions. For example, if an original order for datapoints is A, B, C, d, where dimension 1 is 1 1 0 0 and dimension 2 is 0 1 1 0 (e.g., datapoint A has a 1 for dimension 1 but a 0 for dimension 2, datapoint B has a 1 for dimension 1 and a 1 for dimension 2, etc.) the permutation obtained via gray-coding swaps the order of datapoint A and datapoint B so that on dimension 2 there is also a contiguous block. In other words, the permutation after gray-coding would be B, A, C, d. Implementations can include other similar variants.

Once the permutation π is determined, the system updates the inverted index based on the permutation (640). For example, the system updates the inverted index 305 of FIG. 3 with the permutation it to become cache-sorted inverted index 336 of FIG. 3. The system can then use the updated, cache-sorted inverted index in determining the inner product of the sparse component of a query vector and the sparse components of the data records. For example, the system may determine which dimensions of the query are non-zeros and use the indices for those dimensions to calculate the inner product, using the permutation to determine which datapoints are accessed. For example, the system may perform a translation of the non-zero dimensions of the query so that the query dimensions match the original/unpermutated database dimensions.

Figure 8:
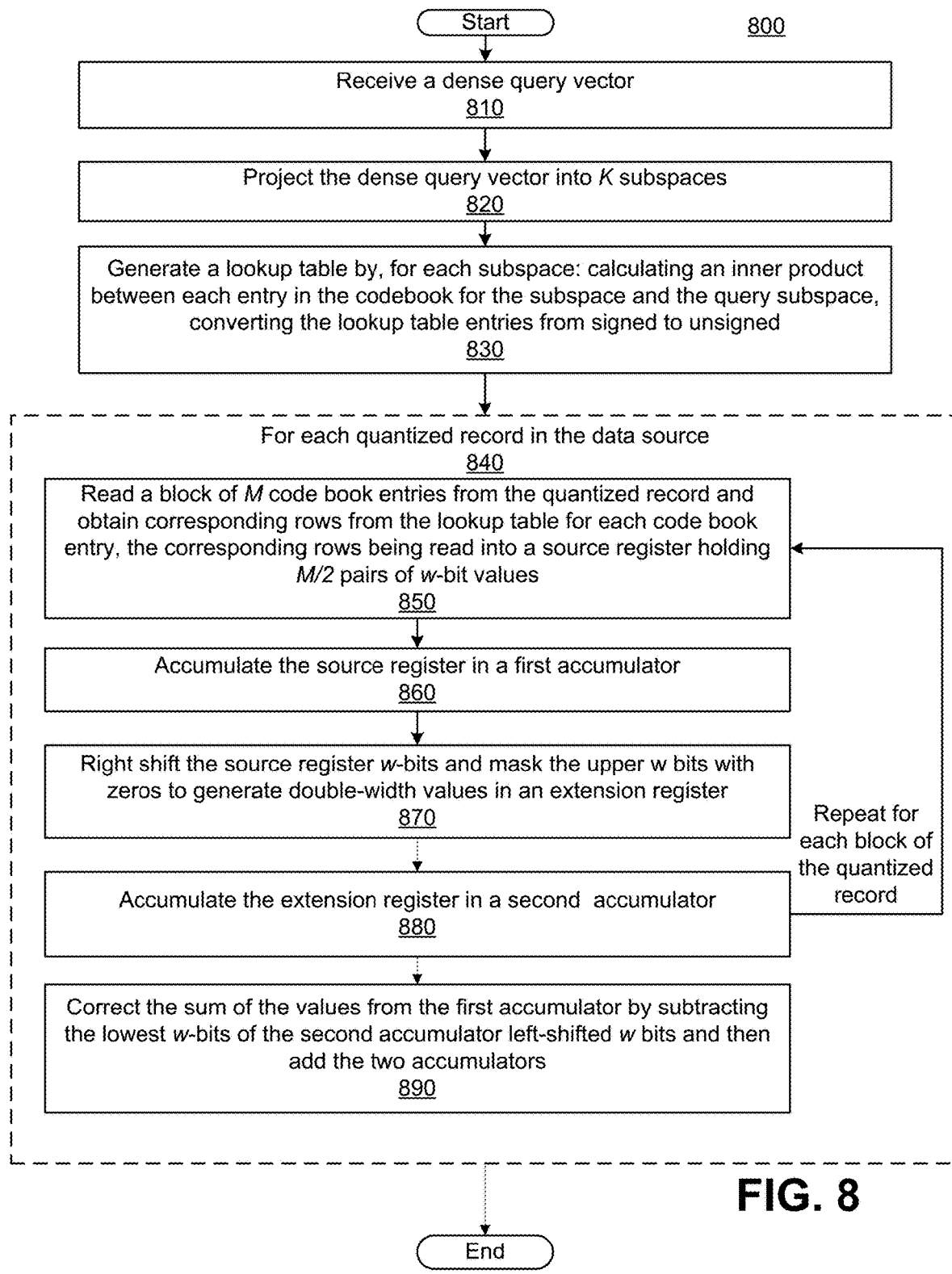
FIG. 8 illustrates a flow diagram of an example process for efficiently calculating an inner-product between a quantized data item and a query vector, in accordance with disclosed subject matter.

FIG. 8 illustrates a flow diagram of an example process 800 for efficiently calculating an inner-product between a quantized data item and a query vector, in accordance with disclosed subject matter. Process 800 may be performed as part of step 440 of FIG. 4, where the dense inner product uses quantization. Process 800 may be performed by any MIPS system that uses product quantization and is not limited to a system for efficient inner product approximation for hybrid records. For ease of explanation, and not by way of limitation, the example described herein uses LUT16 (16 code words per codebook, or in other words C=16). However, implementations include other values of C that correspond with the capacity of a SIMD register (e.g., 32, 64, etc.) with appropriate modifications to block size and bit-width.

Process 800 begins by receiving a dense query vector (810). The dense query vector can be the dense component of a hybrid query vector, or can be the entire query vector. The system projects the dense query vector into K subspaces (820). The projection is the same projection used to generate the codebooks, e.g., in step 540 of FIG. 5, e.g., so each subspace represents a number of dimensions within the vector. The system generates a lookup table (LUT) for the query (830). The system generates the lookup table by, for each subspace, calculating an inner product between each entry in the codebook for the subspace and the query subspace.

Figure 9A:
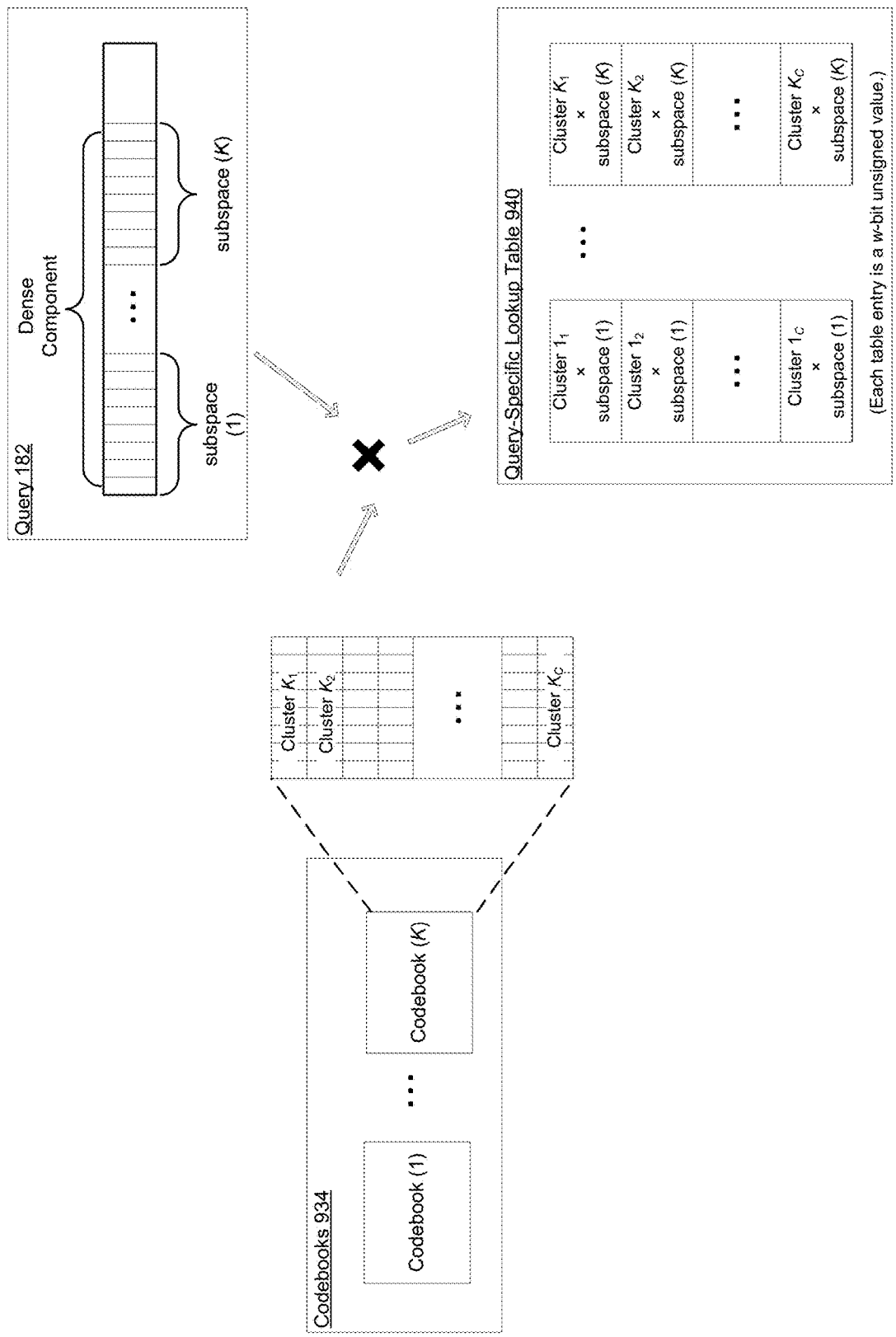
FIG. 9A is a block diagram of generating a query-specific lookup table, in accordance with disclosed subject matter.

FIG. 9A is a block diagram illustrating the generation a query-specific lookup table. The codebooks 934 of FIG. 9A are similar to the codebooks 134 of FIG. 1, and include one codebook for each subspace. Each codebook has C entries and each entry represents some number of dimensions. In the example of FIG. 9A, C is 16 and each entry represents eight dimensions, although implementations need not have this number of dimensions in a subspace and may not have the same number of dimensions in each subspace.

The system generates the query-specific lookup table 940 by calculating the cross product between the query and each corresponding codebook. In other words, the system calculates the cross product of subspace (1) of the query with cluster center $1_1$ in codebook (1), cluster center $1_2$ in codebook (1), cluster center $1_3$ in codebook (1), etc., and places the result of each cross product into an entry in the lookup table. The cross product in the example of FIG. 9A is an 8-bit number (w=8) and represents the similarity between the query subspace and the cluster center of the code book. Thus, each subspace will have 16 8-bit values (where C=16 and w=8), which means that each subspace fits into a register and can be accessed using a PSHUFB x86 instruction. In some implementations, the values in the query-specific lookup table are converted, or biased, from signed to unsigned.

Once the system generates the query-specific lookup table, the system begins calculating the inner product approximation of each record in the data store using the query-specific lookup table and the quantized dense component records (840). The loop represented by step 840 is thus performed once for each of the N records in the data store. N can be millions of records. Because the query-specific lookup table has 16 entries, the inner product approximation is sometimes referred to as LUT16. The system gets a block of M datapoints (e.g., 32 datapoints) from the quantized data records, and uses these datapoints to obtain M corresponding entries from the lookup table (e.g., look-up table 940) using a PSHUFB instruction. A PSHUFB instruction performs 32 parallel 16-way lookups of 8-bit values. Thus, in this example, w=8 and M=32. The values retrieved represent the dot product between the query vector and the data record for that particular subspace.

Figure 9B:
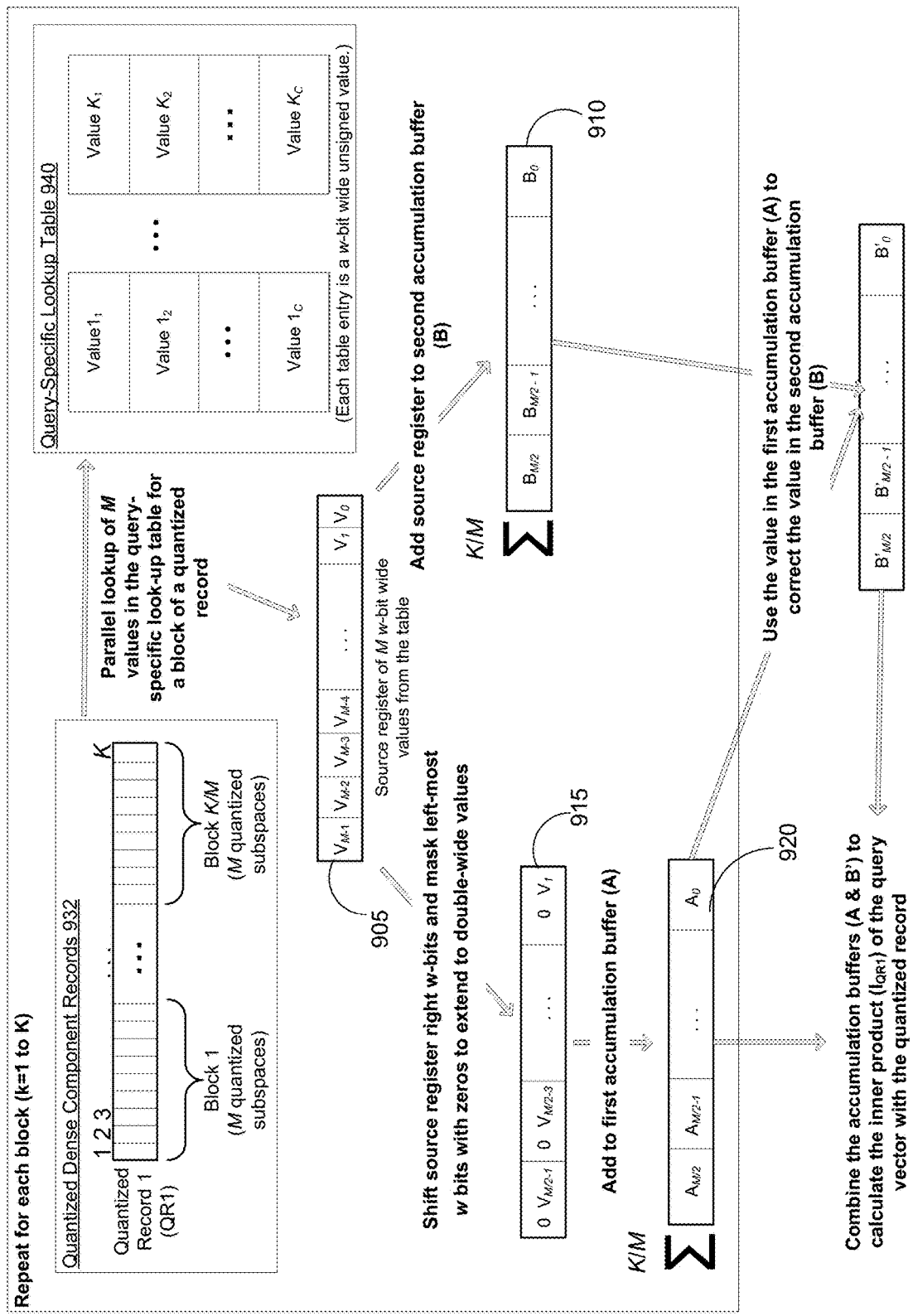
FIG. 9B is a block diagram of using the query-specific lookup table in an efficient inner-product approximation with quantized data items, in accordance with disclosed subject matter.

FIG. 9B is a block diagram illustrating the use of the query-specific lookup table in an efficient inner-product approximation with quantized data items. In the example of FIG. 9B, the quantized dense component records 932 are similar to the quantized dense component records 132 of FIG. 1. In the example of FIG. 9B, each quantized record includes a 2-bit value for each of K subspaces. Each 2-bit value is an index (0 to 15) into the codebook for that subspace. The query-specific lookup table 940 is the dot-product between each codebook and the corresponding subspace of the query vector. Thus, for example, datapoint 1 is an index pointing to one of value $1_1$ to value $1_C$ of the query-specific lookup table 940. The PSHUFB instruction will put the value corresponding to the datapoint into the source register 905. This done 32 times, so that the source register 905 has 32 8-bit values (e.g., $v_1$ to $v_M$). The system needs to sum these values to provide the inner product score for the data record.

In order to perform the accumulation without overflowing, conventional systems extend the source register 905 of 8-bit values into two extension registers of 16-bit values. Each PSHUFB instruction places the values from the lookup table in a register with two 128-bit lanes (an upper land and a lower lane), each lane holding 16 8-bit values. Conventional systems perform sign extension within each 128-bit lane using PCMP and PUNPCK instructions, resulting in a first extension register with 16 16-bit values and a second extension register with 16 16-bit values. Each extension register is accumulated into a respective accumulation register, e.g., using two PADDW instructions that perform parallel addition. Once all blocks have been read the accumulation registers are added together to produce the inner product approximation for the database record, and the loop starts again with the next record. The sign extensions run in a tight loop with few other instructions (e.g., the two accumulation instructions) and thus have a significant performance cost.

Implementations of the scalable MIPS system mitigate this cost by biasing the lookup table by +128, so that the table entries are unsigned. In other words, the system biases the lookup table entries from [−128, +127] to [0, 255]. This is done once per query, i.e., when the query-specific lookup table is generated at step 830, so the cost is negligible. After accumulation, the total bias (e.g., 128*num_blocks) can be subtracted out from the final accumulator value to convert the result back to signed. This is done once per every 32 datapoints in a single dimension, rather than once per block.

In some implementations, as a result of biasing the lookup table, the system can perform zero extension rather than sign extension. In some implementations, the system performs zero extension using fewer processor cycles by using a PUNPCK instruction without a PCMP instruction. In some implementations, the system performs the zero extension by zero-extending the odd and even bytes in the PSHUFB register (the source register 905) using a PSRLW (shift right) and PAND (masking the upper 8-bits of each 16-bit value) instruction in each 128-bit lane. Using PAND and PSRLW improves performance over the PUNPCK instruction because these instructions execute on multiple ports, where the PUNPCK instruction only executes on port 5. The zero-extension of the PSHUFB register leads to two AVX2 registers (a first extension register and a second extension register), each 8-bit value having been doubled to 16-bits, so each AVX2 register holds 16 16-bit numbers. The first extension register holds even bytes from the source register and the second extension register holds even bytes from the source register.

For example if the source register (after the PSHUFB) has the following contents:
Source: A15 A14 A13 . . . A2 A1 A0 B15 B14 B13 . . . B2 B1 B0 where A represents a byte in the upper 128-bit lane of the register and B represents a byte in the lower lane of the register. After zero-extension the two extension registers will include the following contents:
Extension 1: 00 A15 00 A13 . . . 00 A3 00 A1 00 B15 00 B13 . . . 00 B3 00 B1
Extension 2: 00 A14 00 A12 . . . 00 A2 00 A0 00 B14 00 B12 . . . 00 B2 00 B1
The extension registers can be accumulated into the accumulation registers (via two 16-bit addition operations) and the next block can be read from the quantized data record, with the loop repeating until all blocks have been read and accumulated into the two accumulation registers (with bias correction at appropriate times). When all blocks for a data item have been read and accumulated, the two accumulation registers can be added, giving in the inner product approximation for that record. If K=224 and M=32, giving 7 blocks per data item, over a data store having a million records, the savings of one instruction per loop is significant.

In some implementations, the system may further decrease processing cycles and improve performance by eliminating one of the PAND instructions in the zero-extension described above. In such an implementation, the system does not explicitly zero the "even" bytes in the second extension register, thus eliminating the PAND instruction for the second extension register. For example, the system may add the source register to a first accumulator (860). The first accumulator is a register of 16 16-bit values, e.g., accumulation register 910 of FIG. 9B. In some implementations, the source register 905 may be moved to an extension register and then added to the accumulation register. In either case, the "even" values (e.g., $V_2$, $V_4$, $V_6$, etc.) from the source register are at the right of each of the 16-bit values in the register (e.g., in either the extension register or the source register) when it is accumulated into the first accumulation register 910. The system may right-shift the data in the source register w bits (e.g., 8 bits) into an extension register 915 using a PSRLW instruction and then mask the left w bits with zeros (870) with a PAND instruction. This ensures the left w bits are zero and the right w bits have the "odd" values (e.g., $V_1$, $V_3$, $V_5$, etc.). This is zero-extension, but occurs only for the "odd" values. The extension register 910 looks like the Extension 2 register mentioned above. The extension register 910 is accumulated into a second accumulation register 920 (880). After the accumulations, the system repeats this loop (e.g., 850 to 880) for another block of M codebook entries until all codebook entries for this record have been included in the accumulation registers.

Not explicitly zeroing the "even" extension register produces an accumulation result in the first accumulator 910 that is wrong by a large but known value. The system corrects this value during a post-processing step for each record. The post processing step (890) occurs prior to adding the two accumulators and includes shifting the second accumulator 920 (the accumulator for the "odd" values) left by 8-bits (i.e., w-bits) and then subtracting this from the first accumulator 910 (the accumulator for the "even" values, which needs correcting). This works because the overflows during addition are perfectly matches by a corresponding underflow during subtraction. The two accumulators are then added to give the inner product for the record. This process (840) is repeated for each record in the data source. When the system has finished calculating the inner product score for all records, process 800 ends.

The more efficient LUT16 operation described by process 800 is able to sustain 16.5 lookup-accumulate operations per clock-cycle on Intel Haswell CPUs for batches of 3 or more queries. This includes the overhead for post-processing the final inner product. This is more than 8 times better than a LUT256 implementation's architectural upper bound of two scalar loads per clock-cycle. When the efficient LUT16 operation described by process 800 operates on 1 query at a time, the CPU can compute inner products faster than it can stream the codes from main memory, which means the performance is constrained only by memory bandwidth.

Figure 10:
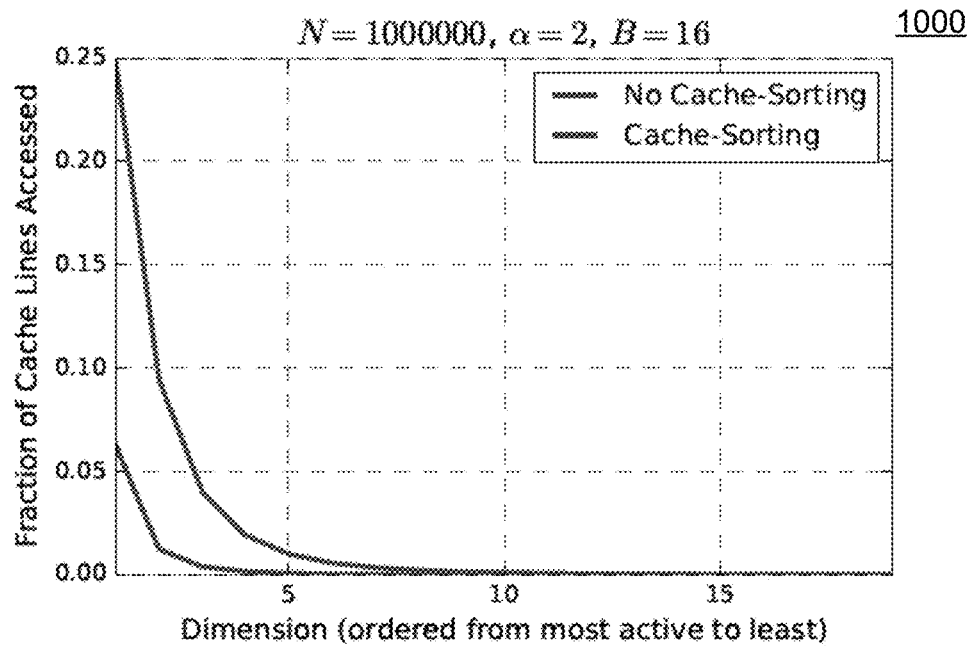
FIG. 10 is a graph illustrating example savings in cache-line accesses achieved using the cache-sorted inverted index.

FIG. 10 is a graph 1000 illustrating example savings in cache-line accesses achieved using the cache-sorted inverted index. In FIG. 10, N is one million (e.g., data records 130 includes 1 million records), B (number of values that fit in a cache-line) is 16, and $\alpha$ is the exponent of the power distribution that probabilities follow, or in other words $P_j \propto j^{-\alpha}$. The graph 1000 plots the expected fraction of cache-lines access in the unsorted inverted index and the upper bound on the fraction in cache-sorted inverted index at each dimension. With cache-sorting, the expected number of cache-line accesses as well as the total expected number of accesses (area under the curve) drop significantly across all dimensions.

Figure 11:
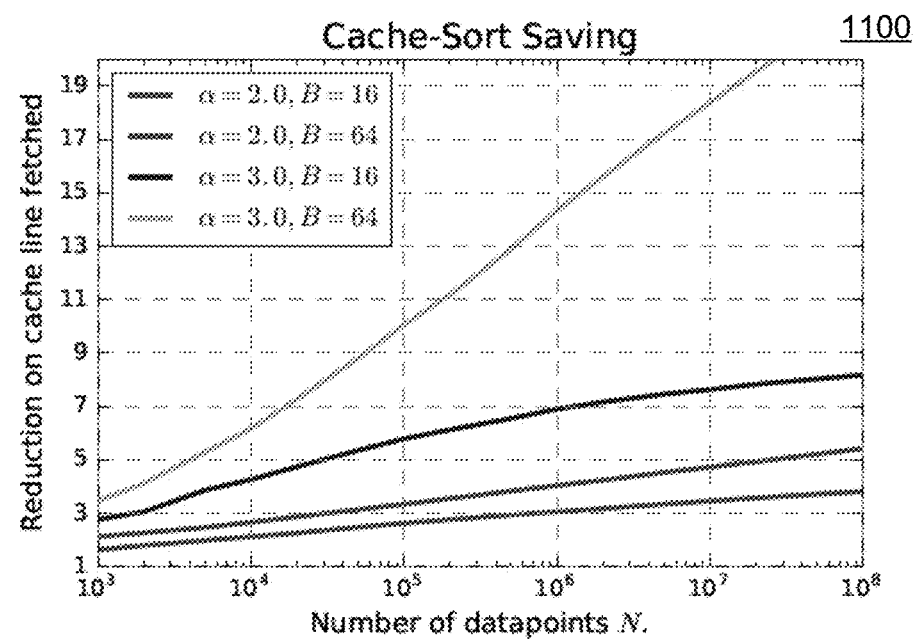
FIG. 11 is a graph illustrating the reduction in cache-line accesses achieved using the cache-sorted inverted index.

FIG. 11 is a graph 1100 illustrating the reduction in cache-line accesses achieved using the cache-sorted inverted index. The graph 1100 illustrates the effect of the parameters N, $\alpha$ and B. As $\alpha$ increases, the 'active' dimensions (the dimensions with nonzero values) contain more datapoints, resulting in large cache-sorting impact. The amount of saving also increases with cache-line size B. The graphs 1000 and 1100 assume zero correlation between activity patterns of different dimensions. However, most real-world datasets have significant correlations among dimensions, e.g., several dimensions tend to be active together. In such real-world dataset, cache-sorting the inverted index can result in 10× improvement in throughput. In addition to the benefits of reducing the total number of cache-lines read from main memory, for active dimensions, cache-sorting creates long sequential runs of non-zeros that can be encoded efficiently and computed with vectorized SIMD instructions, further increasing the throughput.

The following benchmarks illustrate the benefits of various implementations over existing techniques. The benchmarks use two public hybrid datasets (e.g., datasets with both dense and sparse vectors). Table 1 illustrates the characteristics of the two databases:

TABLE 1

| | Dimension (d) | | |
|---|---|---|---|
| | Dense | Sparse | Size (n) |
| Dataset1 | 300 | 180,000 | 500,000 |
| Dataset2 | 300 | 270,000 | 140,000 |

The benchmark goal is to retrieve to 20 items. For comparison, the following baselines were used: a) Dense Brute Force is an exact method where zeros were padded to the sparse component to make the dataset completely dense. b) Sparse Brute Force is an exact method where the sparse representation of the dense component is appended to the end of the sparse component to make the dataset completely sparse. c) Sparse With Index is similar to Sparse Brute Force but with a cache-sorted inverted index. d) Hamming (512) is a hashing method where each datapoint is projected onto 512 Radmacher vectors and then the projected values are binarized with media thresholding. These 512-bit binary codes are used to perform hamming distance search and retrieve the top 5K points, from which 20 are retrieved via exact search. e) Dense PQ, Reordering 10K applies product quantization to only the dense component. From this index the top 10K records are identified and then the top 20 returned via exact search. f) Sparse Inverted Index, No Reordering retrieves the top 20 from the sparse component with an inverted index and returns those records. g) Sparse Inverted Index, Reordering 20K retrieves the top 20K records from the sparse component with an inverted index and then computes the exact inner product of the 20K to select the final 20. h) The hybrid method is a combination of Dense PQ and sparse inverted index with reordering.

Table 2 illustrates a comparison of the different methods on the two public datasets. Table 2 illustrates that the hybrid method gives very fast search with high recall.

TABLE 2

| | Dataset1 | | Dataset2 | |
|---|---|---|---|---|
| Algorithm | Time | Recall | Time | Recall |
| Dense Brute Force | 3464 | 100% | 1242 | 100% |
| Sparse Brute Force | 905 | 100% | 205 | 100% |
| Sparse Inverted Index | 63.9 | 100% | 15.7 | 100% |
| Hamming (512 bits) | 16.0 | 9% | 11.5 | 20% |
| Dense PQ, Reordering 10k | 52.2 | 98% | 29.4 | 100% |
| Sparse Inverted Index, No Reordering | 22.8 | 29% | 5.1 | 98% |
| Sparse Inverted Index, Reordering 20k | 96.8 | 70% | 49.0 | 100% |
| Hybrid (ours) | 18.8 | 91% | 2.6 | 92% |

Extrapolating the results to all-pair search scenario (i.e., both query and database sets are the same, each with 1 billion datapoints), with 1000 CPU cores, the exact sparse brute force methods will take 9 years to complete the 1 billion×1 billion search, while the sparse inverted index will take about 3 months. The hybrid approach of disclosed implementations completes the task in under 1 week.

FIG. 12 shows an example of a generic computer device 1200, which may be server 110, and/or client 170 of FIG. 1, which may be used with the techniques described here. Computing device 1200 is intended to represent various example forms of computing devices, such as laptops, desktops, workstations, personal digital assistants, cellular telephones, smart phones, tablets, servers, and other computing devices, including wearable devices. The components shown here, their connections and relationships, and their functions, are meant to be examples only, and are not meant to limit implementations of the inventions described and/or claimed in this document.

Computing device 1200 includes a processor 1202, memory 1204, a storage device 1206, and expansion ports 1210 connected via an interface 1208. In some implementations, computing device 1200 may include transceiver 1246, communication interface 1244, and a GPS (Global Positioning System) receiver module 1248, among other components, connected via interface 1208. Device 1200 may communicate wirelessly through communication interface 1244, which may include digital signal processing circuitry where necessary. Each of the components 1202, 1204, 1206, 1208, 1210, 1240, 1244, 1246, and 1248 may be mounted on a common motherboard or in other manners as appropriate.

The processor 1202 can process instructions for execution within the computing device 1200, including instructions stored in the memory 1204 or on the storage device 1206 to display graphical information for a GUI on an external input/output device, such as display 1216. Display 1216 may be a monitor or a flat touchscreen display. In some implementations, multiple processors and/or multiple buses may be used, as appropriate, along with multiple memories and types of memory. Also, multiple computing devices 1200 may be connected, with each device providing portions of the necessary operations (e.g., as a server bank, a group of blade servers, or a multi-processor system).

The memory 1204 stores information within the computing device 1200. In one implementation, the memory 1204 is a volatile memory unit or units. In another implementation, the memory 1204 is a non-volatile memory unit or units. The memory 1204 may also be another form of computer-readable medium, such as a magnetic or optical disk. In some implementations, the memory 1204 may include expansion memory provided through an expansion interface.

The storage device 1206 is capable of providing mass storage for the computing device 1200. In one implementation, the storage device 1206 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also include instructions that, when executed, perform one or more methods, such as those described above. The computer- or machine-readable medium is a storage device such as the memory 1204, the storage device 1206, or memory on processor 1202.

The interface 1208 may be a high speed controller that manages bandwidth-intensive operations for the computing device 1200 or a low speed controller that manages lower bandwidth-intensive operations, or a combination of such controllers. An external interface 1240 may be provided so as to enable near area communication of device 1200 with other devices. In some implementations, controller 1208 may be coupled to storage device 1206 and expansion port 1214. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1200 may be implemented in a number of different forms, as shown in the figure. For example, it may be implemented as a standard server 1230, or multiple times in a group of such servers. It may also be implemented as part of a rack server system. In addition, it may be implemented in a personal computer such as a laptop computer 1222, or smart phone 1236. An entire system may be made up of multiple computing devices 1200 communicating with each other. Other configurations are possible.

FIG. 13 shows an example of a generic computer device 1300, which may be server 110 of FIG. 1, which may be used with the techniques described here. Computing device 1300 is intended to represent various example forms of large-scale data processing devices, such as servers, blade servers, datacenters, mainframes, and other large-scale computing devices. Computing device 1300 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 1300 may include any number of computing devices 1380. Computing devices 1380 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 1380a includes multiple racks 1358a-1358n. Each rack may include one or more processors, such as processors 1352a-1352n and 1362a-1362n. The processors may include data processors, network attached storage devices, and other computer controlled devices. In some implementations, one processor may operate as a master processor and control the scheduling and data distribution tasks. Processors may be interconnected through one or more rack switches 1358, and one or more racks may be connected through switch 1378. Switch 1378 may handle communications between multiple connected computing devices 1300.

Each rack may include memory, such as memory 1354 and memory 1364, and storage, such as 1356 and 1366. Storage 1356 and 1366 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 1356 or 1366 may be shared between multiple processors, multiple racks, or multiple computing devices and may include a computer-readable medium storing instructions executable by one or more of the processors. Memory 1354 and 1364 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 1354 may also be shared between processors 1352a-1352n. Data structures, such as an index, may be stored, for example, across storage 1356 and memory 1354. Computing device 1300 may include other components not shown, such as controllers, buses, input/output devices, communications modules, etc.

An entire system, such as system 100, may be made up of multiple computing devices 1300 communicating with each other. For example, device 1380a may communicate with devices 1380b, 1380c, and 1380d, and these may collectively be known as system 100. As another example, system 100 of FIG. 1 may include one or more computing devices 1300. Some of the computing devices may be located geographically close to each other, and others may be located geographically distant. The layout of system 1300 is an example only and the system may take on other layouts or configurations.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer system comprising:
   at least one processor;
   a data store of hybrid records, each hybrid record in the data store including a dense component and a sparse component; and
   memory storing instructions that, when executed by the at least one processor, cause the system to:
   receive a query request that includes a query vector;
   generate a dense query component and a sparse query component from the query vector;
   determine dense component similarity values based on approximating inner products between the dense query component and dense components of at least some of the hybrid records;
   determine sparse component similarity values using the sparse query component and sparse components of at least some of the hybrid records;
   select an initial set of hybrid records from the data store based on the dense component similarity values and the sparse component similarity values; and
   respond to the query request with at least some of the records from the initial set of hybrid records.

2. The computer system of claim 1, wherein the instructions further cause the system to:
   determine actual dense inner products between the dense query component and dense components of at least some of the hybrid records from the initial set of hybrid records; and
   select a first refined set of hybrid records from the initial set of hybrid records based on combinations of the actual dense inner products and the sparse component similarity values.

3. The computer system of claim 2, wherein responding to the query request with at least some of the records from the initial set of hybrid records includes responding to the query request with at least some of the records from the first refined set of hybrid records.

4. The computer system of claim 2, wherein the sparse component similarity values are determined based on approximating inner products between the sparse query component and sparse components of at least some of the hybrid records, and the instructions further cause the system to:
   determine actual sparse inner products between the sparse query component and sparse components of at least some of the records from the first refined set of hybrid records; and
   select a second refined set of hybrid records from the first refined set of hybrid records based on combinations of the actual dense inner products and the actual sparse inner products.

5. The computer system of claim 4, wherein responding to the query request with at least some of the records from the first refined set of hybrid records includes responding to the query request with at least some of the records from the second refined set of hybrid records.

6. The computer system of claim 1, wherein the sparse component similarity values are determined based on calculating sparse inner products between the sparse query component and sparse components of at least some of the hybrid records.

7. The computer system of claim 1, wherein generating the sparse query component and the dense query component includes classifying dimensions of the hybrid records based on the number of non-zero values present for the dimension in the hybrid records.

8. A non-transitory computer-readable storage medium having stored thereon computer executable program code which, when executed on a computer system, causes the computer system to perform a method, comprising:
   receiving a query request that includes a query vector;
   generating a dense query component and a sparse query component from the query vector;
   determining dense component similarity values based on approximating inner products between the dense query component and dense components of at least some hybrid records of a data store of hybrid records, each hybrid record in the data store including a dense component and a sparse component;
   determining sparse component similarity values using the sparse query component and sparse components of at least some of the hybrid records;
   selecting an initial set of hybrid records from the data store based on the dense component similarity values and the sparse component similarity values; and
   responding to the query request with at least some records from the initial set of hybrid records.

9. The computer-readable storage medium of claim 8, further comprising code for:
   determining actual dense inner products between the dense query component and dense components of at least some of the hybrid records from the initial set of hybrid records; and
   selecting a first refined set of hybrid records from the initial set of hybrid records based on combinations of the actual dense inner products and the sparse component similarity values.

10. The computer-readable storage medium of claim 9, wherein responding to the query request with at least some of the records from the initial set of hybrid records includes responding to the query request with at least some of the records from the first refined set of hybrid records.

11. The computer-readable storage medium of claim 9, wherein the sparse component similarity values are determined based on approximating inner products between the sparse query component and sparse components of at least some of the hybrid records, and further comprising code for:
   determining actual sparse inner products between the sparse query component and sparse components of at least some of the records from the first refined set of hybrid records; and
   selecting a second refined set of hybrid records from the first refined set of hybrid records based on combinations of the actual dense inner products and the actual sparse inner products.

12. The computer-readable storage medium of claim 11, wherein responding to the query request with at least some of the records from the first refined set of hybrid records includes responding to the query request with at least some of the records from the second refined set of hybrid records.

13. The computer-readable storage medium of claim 8, wherein the sparse component similarity values are determined based on calculating sparse inner products between the sparse query component and sparse components of at least some of the hybrid records.

14. The computer-readable storage medium of claim 8, wherein generating the sparse query component and the dense query component includes classifying dimensions of the hybrid records based on the number of non-zero values present for the dimension in the hybrid records.

15. A method, comprising:
receiving a query request that includes a query vector;
generating a dense query component and a sparse query component from the query vector;
determining dense component similarity values based on approximating inner products between the dense query component and dense components of at least some hybrid records in a data store of hybrid records, each hybrid record in the data store including a dense component and a sparse component;
determining sparse component similarity values using the sparse query component and sparse components of at least some of the hybrid records;
selecting an initial set of hybrid records from the data store based on the dense component similarity values and the sparse component similarity values; and
responding to the query request with at least some records from the initial set of hybrid records.

16. The method of claim 15, further comprising:
determining actual dense inner products between the dense query component and dense components of at least some of the hybrid records from the initial set of hybrid records; and
selecting a first refined set of hybrid records from the initial set of hybrid records based on combinations of the actual dense inner products and the sparse component similarity values.

17. The method of claim 16, wherein responding to the query request with at least some of the records from the initial set of hybrid records includes responding to the query request with at least some of the records from the first refined set of hybrid records.

18. The method of claim 16, wherein the sparse component similarity values are determined based on approximating inner products between the sparse query component and sparse components of at least some of the hybrid records, and further comprising:
determining actual sparse inner products between the sparse query component and sparse components of at least some of the records from the first refined set of hybrid records; and
selecting a second refined set of hybrid records from the first refined set of hybrid records based on combinations of the actual dense inner products and the actual sparse inner products.

19. The method of claim 18, wherein responding to the query request with at least some of the records from the first refined set of hybrid records includes responding to the query request with at least some of the records from the second refined set of hybrid records.

20. The method of claim 15, wherein the sparse component similarity values are determined based on calculating sparse inner products between the sparse query component and sparse components of at least some of the hybrid records.

21. The computer system of claim 1, wherein a dense component of at least some of the hybrid records has at least a threshold percentage of non-zero values across the at least some of the hybrid records.

22. The computer system of claim 1, wherein a sparse component of at least some of the hybrid records has less than a threshold percentage of non-zero values across the at least some of the hybrid records.

* * * * *